(12) United States Patent
Kim

(10) Patent No.: US 12,260,253 B2
(45) Date of Patent: Mar. 25, 2025

(54) LAYOUT-BASED DATA TRANSFER BETWEEN SYNCHRONIZED, INTERCONNECTED PROCESSING ELEMENTS FOR IMPLEMENTING MACHINE LEARNING NETWORKS

(71) Applicant: SiMa Technologies, Inc., San Jose, CA (US)

(72) Inventor: Gwangho Kim, San Jose, CA (US)

(73) Assignee: SiMa Technologies, Inc., San Jose, CA (US)

( * ) Notice: Subject to any disclaimer, the term of this patent is extended or adjusted under 35 U.S.C. 154(b) by 166 days.

(21) Appl. No.: 18/158,447

(22) Filed: Jan. 23, 2023

(65) Prior Publication Data

US 2024/0248760 A1 Jul. 25, 2024

(51) Int. Cl.
G06F 9/44 (2018.01)
G06F 9/50 (2006.01)
G06F 15/80 (2006.01)

(52) U.S. Cl.
CPC ............ *G06F 9/5027* (2013.01); *G06F 15/80* (2013.01)

(58) Field of Classification Search
None
See application file for complete search history.

(56) References Cited

U.S. PATENT DOCUMENTS

| | | |
|---|---|---|
| 9,928,460 B1 | 3/2018 | Nowatzyk et al. |
| 10,733,016 B1 * | 8/2020 | Xu .................. G06N 20/00 |
| 11,354,570 B2 * | 6/2022 | Shah .................. G06F 9/5066 |
| 11,586,894 B2 | 2/2023 | Kotler et al. |
| 11,734,605 B2 | 8/2023 | Kotler et al. |
| 11,803,740 B2 | 10/2023 | Kotler et al. |
| 11,886,981 B2 | 1/2024 | Shah et al. |
| 2001/0029520 A1 | 10/2001 | Miyazaki et al. |
| 2005/0257194 A1 | 11/2005 | Morrow et al. |
| 2013/0297370 A1 | 11/2013 | Pegden |
| 2016/0379686 A1 | 12/2016 | Burger et al. |
| 2017/0103299 A1 | 4/2017 | Aydonat et al. |
| 2017/0178386 A1 | 6/2017 | Redshaw et al. |
| 2018/0322386 A1 | 11/2018 | Sridharan et al. |
| 2019/0004878 A1 | 1/2019 | Adler et al. |
| 2019/0018815 A1 | 1/2019 | Fleming et al. |
| 2019/0076031 A1 | 3/2019 | Valys et al. |

(Continued)

OTHER PUBLICATIONS

Yiran Chen et al., "A Survey of Accelerator Architectures for Deep Neural Networks", 2022 (Year: 2020).*

(Continued)

*Primary Examiner* — Anil Khatri
*Assistant Examiner* — Lanny N Ung
(74) *Attorney, Agent, or Firm* — Fenwick & West LLP

(57) ABSTRACT

A machine learning accelerator (MLA) implements a machine learning network (MLN) by using data transfer instructions that coordinate concurrent data transfers between processing elements. A compiler receives a description of a machine learning network and generates the computer program that implements the MLN. The computer program contains instructions that will be run on PEs of the MLA. The PEs are connected by data transfer paths that are known to the compiler. The computations performed by the PEs may require data stored at other PEs. The compiler coordinates the data transfers to avoid conflicts and increase parallelism.

20 Claims, 24 Drawing Sheets

(56) References Cited

U.S. PATENT DOCUMENTS

| | | |
|---|---|---|
| 2019/0114548 A1 | 4/2019 | Wu et al. |
| 2019/0155768 A1 | 5/2019 | Wilkinson et al. |
| 2019/0205737 A1 | 7/2019 | Bleiweiss et al. |
| 2019/0228308 A1* | 7/2019 | Zhou ............... G06N 20/00 |
| 2019/0286973 A1 | 9/2019 | Kovvuri et al. |
| 2019/0303346 A1 | 10/2019 | Brewer |
| 2019/0391796 A1 | 12/2019 | Brady et al. |
| 2019/0392287 A1* | 12/2019 | Ovsiannikov ............ G06N 3/08 |
| 2020/0007342 A1 | 1/2020 | Liem et al. |
| 2020/0012536 A1 | 1/2020 | Lacey et al. |
| 2020/0012537 A1 | 1/2020 | Lacey et al. |
| 2020/0065671 A1 | 2/2020 | Sahni et al. |
| 2020/0073830 A1 | 3/2020 | Verrilli et al. |
| 2020/0090383 A1 | 3/2020 | Dwivedi |
| 2020/0117978 A1 | 4/2020 | Chen et al. |
| 2020/0133914 A1 | 4/2020 | Wilkinson et al. |
| 2020/0150713 A1 | 5/2020 | Knowles et al. |
| 2020/0272892 A1 | 8/2020 | Desappan et al. |
| 2020/0320403 A1 | 10/2020 | Daga et al. |
| 2021/0174137 A1 | 6/2021 | Kim et al. |
| 2021/0191765 A1 | 6/2021 | Bokam et al. |
| 2021/0197967 A1 | 7/2021 | Song et al. |
| 2021/0201526 A1 | 7/2021 | Moloney et al. |
| 2021/0240524 A1 | 8/2021 | Gangani et al. |
| 2021/0278810 A1 | 9/2021 | Heesche et al. |
| 2021/0326189 A1 | 10/2021 | Shah et al. |
| 2021/0342672 A1 | 11/2021 | Bohnstingl et al. |
| 2022/0044153 A1 | 2/2022 | Madar et al. |
| 2022/0121903 A1* | 4/2022 | Zhang ............... G06N 3/04 |
| 2022/0147826 A1 | 5/2022 | Xiao et al. |
| 2022/0244984 A1 | 8/2022 | Lee et al. |
| 2023/0325250 A1* | 10/2023 | Ming Chang ......... G06F 9/5066 718/104 |

OTHER PUBLICATIONS

Behnam Khaleghi et al., "PatterNet: Explore and Exploit Filter Patterns for Efficient Deep Neural Networks", 2022 (Year: 2022).*

Andri et al., "YodaNN: An Architecture for Ultralow Power Binary-Weight CNN Acceleration", IEEE Transactions on Computer-Aided Design of Integrated Circuits and Systems, vol. 37, No. 1, Jan. 2018, pp. 48-60.

Ankit et al., "Puma: A Programmable Ultra-efficient Memristor-based Accelerator for Machine Learning Inference", ASPLOS'19, Apr. 13-17, 2019, Providence, RI, USA, pp. 715-731.

Du et al., "ShiDianNao: Shifting Vision Processing Closer to the Sensor", ISCA'15, Jun. 13-17, 2015, Portland, OR, USA, pp. 92-104.

Everson et al., "A 104.8TOPS/W One-Shot Time-Based Neuromorphic Chip Employing Dynamic Threshold Error Correction in 65nm", IEEE Asian Solid-State Circuits Conference Nov. 5-7, 2018/Tainan, Taiwan, pp. 273-276.

Guha, A. et al., "Deepframe: A Profile-Driven Compiler for Spatial Hardware Accelerators," 2019 28th International Conference on Parallel Architectures and Compilation Techniques (PACT), Sep. 23-26, 2019, pp. 68-81.

Jiao et al., "A 12nm Programmable Convolution-Efficient Neural-Processing-Unit Chip Achieving 825TOPS", ISSCC 2020, Session 7, Feb. 18, 2020, 5 pages.

Lee, J. et al., "On-Device Neural Net Inference with Mobile GPUs," arXiv:1907.01989, Jul. 3, 2019, pp. 1-9.

PCT International Search Report and Written Opinion, PCT Patent Application No. PCT/US2021/027998, Aug. 25, 2021, 22 pages.

PCT International Search Report and Written Opinion, PCT Patent Application No. PCT/US2024/011667, Jun. 21, 2024, 13 pages.

PCT Invitation to Pay Additional Fees, PCT Patent Application No. PCT/US2024/011667, Apr. 5, 2024, two pages.

Reuther et al., "Survey and Benchmarking of Machine Learning Accelerators", 2019 IEEE High Performance Extreme Computing Conference (HPEC) Sep. 24-26, 2019, pp. 1-9.

Shawahna et al., "FPGA-Based Accelerators of Deep Learning Networks for Learning and Classification: A Review", IEEE Access, vol. 7, 2019, pp. 7823-7858.

Sousa, R. et al., "Efficient Tensor Slicing for Multicore NPUs using Memory Burst Modeling," 2021 IEEE 33rd International Symposium on Computer Architecture and High-Performance Computing (SBAC-PAD), Oct. 2021, pp. 84-93.

United States Office Action, U.S. Appl. No. 16/862,515, dated Aug. 17, 2022, 30 pages.

United States Office Action, U.S. Appl. No. 16/865,226, filed Jan. 13, 2023, 14 pages.

United States Office Action, U.S. Appl. No. 16/865,226, filed Jul. 14, 2022, 12 pages.

* cited by examiner

LAYOUT-BASED DATA TRANSFER BETWEEN SYNCHRONIZED, INTERCONNECTED PROCESSING ELEMENTS FOR IMPLEMENTING MACHINE LEARNING NETWORKS

BACKGROUND

1. Technical Field

This disclosure relates generally to the implementation of machine learning networks.

2. Description of Related Art

Machine learning is a powerful recent trend in technology. In machine learning, a model is developed to perform a certain task. The model, which will be referred to as a machine learning network, is trained and deployed in order to carry out that task. For example, a model may be developed to recognize the presence of objects within images captured by a set of cameras. Once the model is deployed, images captured by the cameras are input to the machine learning network, which then outputs whether (or to what confidence level) objects are present within the images.

Machine learning networks typically require a large volume of data transfer and the execution of a large number of computations. As a result, they are commonly implemented in compute facilities with access to significant resources, such as in the cloud or on server clusters with access to complex networking. However, the sources of input to machine learning networks may be located remotely from these compute facilities. For example, cameras and other types of sensors may be located on the edge of the network.

Therefore, it can be advantageous if the machine learning network and computing elements on which it executes was instead embedded on edge devices, such as combined with the camera system.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Machine learning networks (MHLNs) typically require a large number of computations and the handling of a large amount of data for those computations. Most MLNs have an architecture that includes multiple layers, with each layer containing many nodes. A typical node in a machine learning network may compute an output:

$$y = F\left(\sum w_i x_i + b\right) \quad (1)$$

where $x_i$ are the input data to the current layer received from nodes i of a previous layer, $w_i$ are weights, b is a bias and F( ) is a nonlinear operator. These operations may be expressed as tensors:

$$Y = F(WX + B) \quad (2)$$

where X is the input tensor to the current layer from the previous layer, W is a weight tensor, and B is a bias tensor.

The tensor operation Z=WX or Z=WX+B, where X is the input tensor and Z is the output tensor, typically requires a large number of computations which may be allocated to many hardware processing elements (PEs) to compute in parallel. However, in order for a PE to complete the computations allocated to it, the relevant input data must be available to the PE. For the first layer, the input tensor X may be input samples received from external sources. For later layers, the input tensor X typically are outputs computed for previous layers. Including these intermediate values, there may be millions, billions, trillions or even more pieces of data that must be transferred to the right PEs at the right time in order to implement a machine learning network. It would be beneficial to design and schedule these data transfers in a manner that reduces memory usage and communications bandwidth and that allows for increased parallelism in the data transfers and computations.

Figure 1:
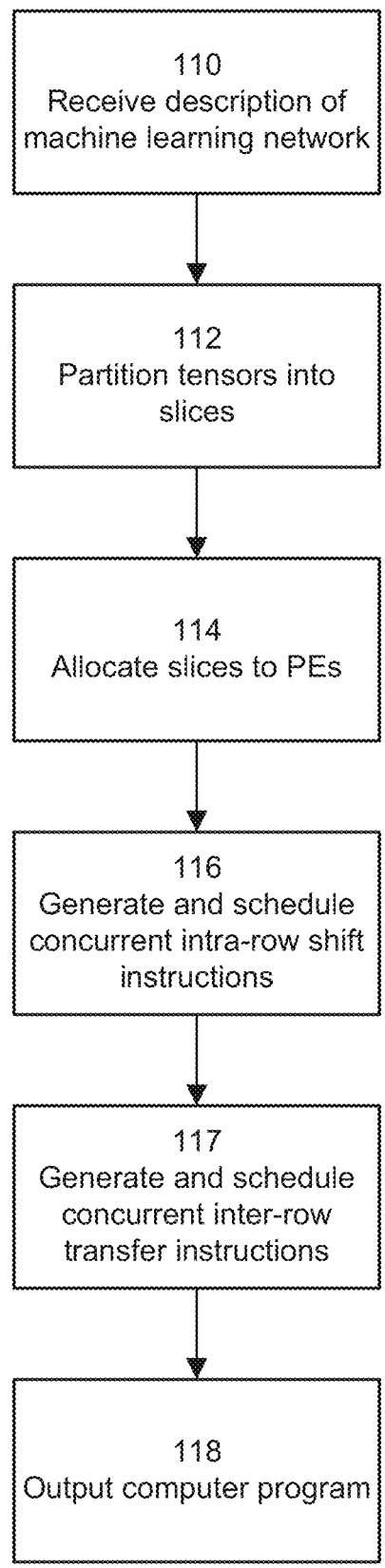
FIG. 1 is a flowchart illustrating a process for generating concurrently executed data transfer instructions.

In one approach, a machine learning accelerator (MLA) achieves this by using data transfer instructions that coordinate concurrent data transfers between PEs, for example as shown in FIG. 1. At 110, a compiler receives a description of a machine learning network and generates the computer program that implements the MLN. The computer program contains instructions that will be run on PEs of the MLA. The PEs are connected by data transfer paths that are known to the compiler.

The MLN includes tensor operations such as those described above in which an output tensor (Z) is computed as a weighted sum of an input tensor (X). At 112, the compiler partitions both the input tensor and the output tensor, and these partitions will be referred to as slices. In a common nomenclature, the tensors are described with three dimensions: two spatial dimensions (row and column, or p and q) and a third channel dimension (k). The partitioning may be described by a parameter "split"=(P,Q,K) where P,Q,K are all integers. Each parameter defines the number of slices along each dimension. For example, a split of (3,4,2) means the p spatial dimension (the rows) is partitioned into 3 row slices, the q spatial dimension (the columns) is partitioned into 4 columns slices, and the channels are partitioned into 2 channel slices. Thus, each slice in this partitioning contains ⅓ the total number of rows, ¼ the total number of columns and ½ the total number of channels, and there are a total of 3×4×2=24 slices for the tensor.

At 114, the compiler allocates each of the input and output slices to PEs. The allocation of input slices may have occurred previously as part of computation of that layer. The PEs that are allocated to slices that form a row of the tensor (or columns could also be used instead of rows) are referred to as a logical row. They may or may not also be arranged to form a physical row of PEs in the MLA. The PEs in a logical row are connected to each other by data transfer paths in the MLA, and the logical rows are also connected to each other by data transfer paths.

The calculation of each output slice uses data from certain input slices. The set of input slices used to calculate an output slice will be referred to as the "support" for that output slice. For example, the support for a particular output slice might include the corresponding input slice, input slices to the right and left of that input slice, and input slices from logical rows above and below that input slice. To calculate the output slice, this data is transferred from the PEs allocated to the supporting input slices to the PE allocated to that particular output slice.

A similar situation exists for each output slice. These data transfers are coordinated to avoid conflicts in the data routing and to increase parallelism of the data transfers. At 116, if the input slice is in the same logical row as the output slice, then the data is transferred from one PE in the logical row to another PE in the same logical row. This may be done via the existing data transfer paths since PEs in each logical row are connected by data transfer paths. Furthermore, these intra-row shifts are executed concurrently for the output slices. For example, the compiler may generate instructions to shift right and may schedule these instructions to be executed concurrently by the PEs so that all the PEs are shifting right at the same time. Note that shift right means shifting to the right of the logical row, which may correspond to different physical directions depending on how the slices are allocated to the PEs. The compiler may also generate instructions to shift left and schedule these instructions to be executed concurrently.

At 117, the compiler generates analogous instructions, but for inter-row transfers. Inter-row transfers move data from a PE in one logical row to a PE in a different logical row. Because the source PE and destination PE are in different rows, the data transfer path may not be as straightforward, particularly if all PEs are transferring data concurrently. In one approach shown in the examples below, these instructions may include instructions to collect data from multiple slices within a logical row, and then distribute this data to multiple slices within a different new logical row. The compiler schedules these instructions so that the PEs coordinate their data transfers. For example, the PEs may concurrently collect data within logical rows, and then concurrently distribute this data within the new logical row.

At 118, the compiler outputs the computer program, including the intra-row shifts of 116 and inter-row transfers of 117. In addition to data transfer instructions, the computer program also includes compute instructions that implement the computations.

FIGS. 2-3 describe an example implementation of an MLA. This example MLA includes a rectangular array of PEs and data transfer paths implemented on a single semiconductor die where the instruction execution is statically scheduled, but the techniques described herein are not limited to this example. The PEs may take different forms, including different cores of a multi-core processor and separate processing chips. The data transfer paths may also include paths within a die, paths between different dies, and even network connections that span larger distances. The instructions also are not required to be statically scheduled.

Figure 2A:
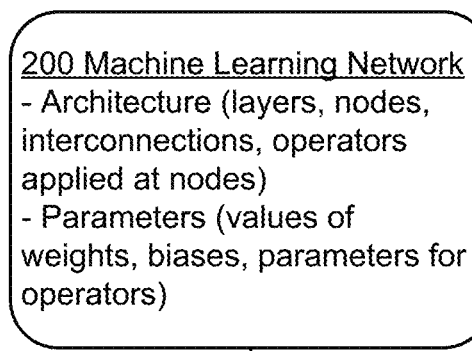
FIG. 2A is a block diagram of a system with a machine learning accelerator (MLA) and corresponding compiler.
Figure 2A:
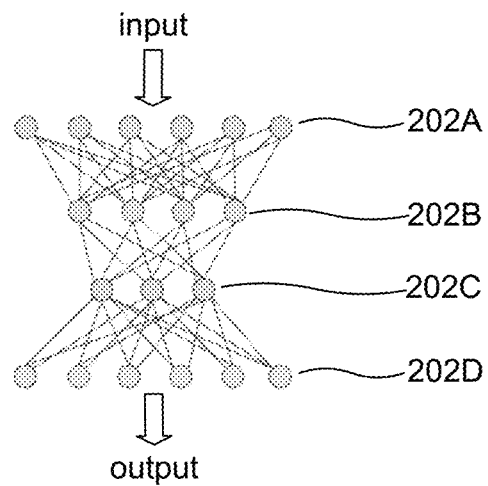
Figure 2A:
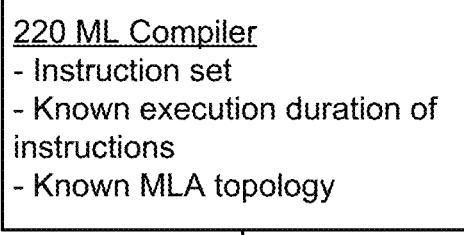
Figure 2A:
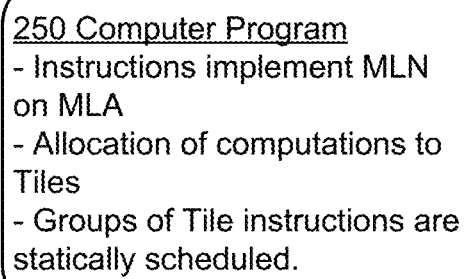
Figure 2A:
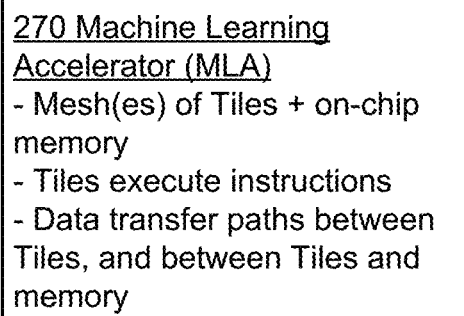
Figure 2A:
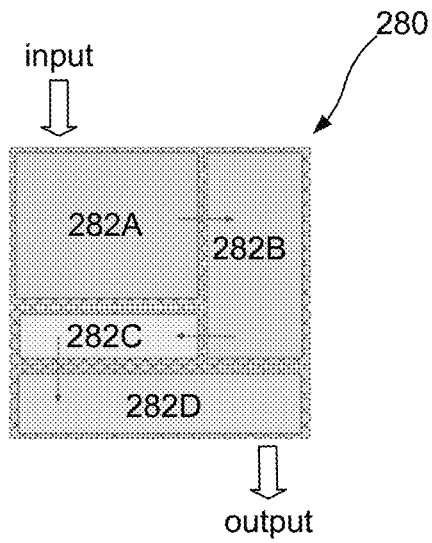

FIG. 2A is a block diagram of one example of a system with a machine learning accelerator (MLA) 270 and corresponding compiler 220. The compiler 220 receives a description of a machine learning network (MLN) 200 and generates a computer program 250 that implements the machine learning network using MLA 270. The computer program 250 includes instructions that are executed by processing elements (Tiles) in the MLA according to a static schedule determined by the compiler. The instructions executed by the Tiles (Tile instructions) are statically scheduled because the compiler can determine which instructions are executed by which Tiles at what times, as will be explained in greater detail below. For example, for the statically scheduled instructions, there are no conditions, branching or data dependencies that can be resolved only at run-time, and which would affect the timing and order of the execution of the instructions. Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the schedule determined by the compiler because the compiler knows how long it takes to execute each instruction. As a result of the static scheduling, the MLA and instruction set for the MLA may be simplified, with the complexity offloaded to the compiler. A simpler MLA can result in lower cost, lower power consumption and higher performance, all of which are desirable for implementation in edge devices.

Figure 2B:
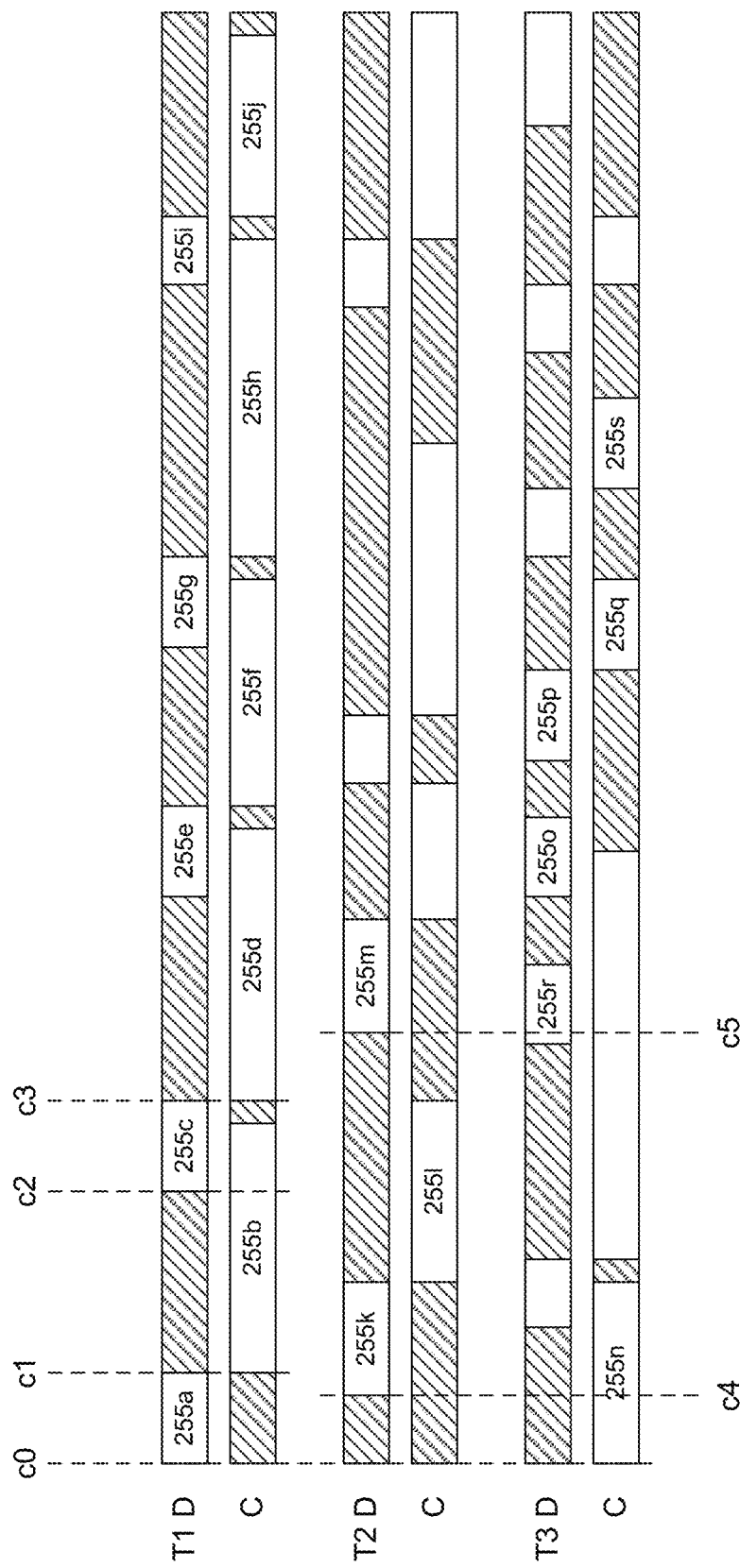
FIG. 2B illustrates execution of statically scheduled instructions.

In more detail, the MLN 200 may be described by an architecture and parameters. A depiction of an MLN is shown to the right of box 200 in FIG. 2A. Most MLNs include multiple layers 202, each with one or more nodes which are represented by circles in FIG. 2A. The lines between nodes in FIG. 2B represent interconnections between the nodes (and layers). Each node calculates a weighted sum of the values received from its connected nodes, possibly also applying a bias. Examples are matrix multiplication and convolution. Each node may also apply certain functionality (operators), such as nonlinear functions (e.g., tanh function), softmax operator, etc. A typical node may compute an output:

$$y = F\left(\sum w_i x_i + b\right) \quad (3)$$

where $x_i$ are the inputs received from other nodes i, $w_i$ are weights, b is a bias and F( ) is a nonlinear operator. The MLN architecture includes the number of nodes (and layers) and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 100 or more layers. Examples of inputs include text, images and video. Some of the layers may be fully interconnected (i.e., every node in one layer provides input to every node in the next layer), and others may be more sparsely and locally interconnected (e.g., to implement convolutions). Each weighted interconnect represents a scalar multiplication. The total number of scalar multiplications required to implement an MLN may be on the order of millions, billions, tens of billions or even more. These may be carried out by matrix multiplications.

The MLA 270 includes a plurality of Tiles 280 and an on-chip memory system implemented on a semiconductor die. The Tiles are organized into one or more meshes of interconnected Tiles. A depiction of a Tile mesh is shown to the right of box 270 in FIG. 2B. In each mesh, the Tiles 280 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., nonlinear functions, lookup table, min/max, pooling). These are computations that implement the MLN. In the example of FIG. 2B, the computations performed by layers 202A-D are allocated to groups 282A-D of Tiles as indicated. The allocation is not required to be 1:1. For example, multiple layers could be allocated to a single Tile or vice versa. Not every computation required to implement an MLN need be executed by a Tile; some computation may be executed outside the MLA (e.g., floating point operations, if the Tiles only do integer arithmetic). Tiles typically will at least perform matrix multiplication.

The compiler 220 receives a description of the MLN 200 and generates a computer program 250 that implements the MLN using the MLA 270. The computer program 250 receives an input sample for the MLN and executes the operations of the MLN to produce the output for the MLN. The computer program 250 includes instructions to be executed by the Tiles for implementing computations in the MLN and may also include instructions to be executed by other elements, such as a controller outside the Tiles.

The compiler generates instructions to be executed by multiple Tiles according to a static schedule. For example, the statically scheduled instructions may include a series of computations required to implement a portion of the MLN, where the time required for each computation and associated data transfers is deterministic. As a result, the compiler may statically schedule these Tile instructions. The resulting computer program produced by the compiler then implements an allocation of instructions to Tiles and a schedule for executing the instructions as determined by the compiler, although these may not be expressly contained within the computer program. In the example of FIG. 2A, the computations performed by layers 202A-D are allocated to groups 282A-D of Tiles as indicated.

Instructions for transferring data to or from the PEs may also be statically scheduled. In order to statically schedule the data transfer instructions, the compiler determines data transfer paths for the data transfers based on a topology of the data transfer paths between PEs, on dependencies of the instructions, on a duration for execution of the instructions, and on how other data transfers are utilizing the available data transfer paths. Because the compiler can determine these at compile-time rather than at run-time, it can ensure that the data transfer instructions are not conflicting (i.e., two instructions are not scheduled to use the same data transfer path at the same time). The statically scheduled data transfer instructions can be executed by the PEs without requiring hardware that implements hardware routing tables or congestion arbitration (e.g., queuing for managing contention and collision).

Not all instructions have to be statically scheduled. For example, data fetch or instruction fetch from off-chip memory where the time required to execute the operation varies too much to allow reliable synchronization with other operations may not be statically scheduled. Other examples include computations that occur off-chip, and conditions, branching and other programmatic constructs that depend on values not known until run-time.

FIG. 2B shows a static schedule computed by the compiler for executing Tile instructions. The static schedule begins at some time when all of the Tiles are synchronized, which for convenience is marked as cycle c0 in FIG. 2B. The Tiles may have circuitry that synchronizes the Tiles. For example, each Tile may monitor when it is ready to begin execution of statically scheduled instructions and then actual execution begins when all Tiles signal that they are ready. Alternatively, an external controller may synchronize the Tiles and start the static schedule when all Tiles are ready.

In this example, the instructions are executed by three Tiles, as denoted by T1, T2 and T3. Each Tile has two pipelines: a "D" pipeline for executing data transfer instructions and a "C" pipeline for executing compute instructions. The row labeled T1 D shows instructions executed by the Tile 1 D (data transfer) pipeline, and the row labeled T1 C shows instructions executed by the Tile 1 C (compute) pipeline. For this example, assume that all the data transfer instructions are instructions that load new data into that Tile for consumption by the compute pipeline. The white regions of each row denote the execution of instructions and the hashed regions indicate that the pipeline is idling or executing a NO-OP (no operation).

For Tile 1, instruction 255a transfers data into Tile 1 and instruction 255b then performs a computation that consumes that data. Instruction 255b is dependent on instruction 255a. Here, the T1 C pipeline is not required to continuously poll the T1 D pipeline at run-time for when the data is available, and run-time message passing between the pipelines is not required to indicate that the data is available. Rather, because the duration (i.e., time required to execute) of instruction 255a is known, the compiler knows when the data will be available (for convenience, marked as cycle c1 in the figure) and can construct a static schedule in which instruction 255b starts execution then. The duration of instruction 255b is also known, so the compiler knows that compute instruction 255d may start after instruction 255b. In this case, the compiler determines a static schedule in which instruction 255d starts at cycle c3. Compute instruction 255d depends on data brought into the Tile by instruction 255c. The duration of instruction 255c is known, so the compiler knows that in the static schedule, instruction 255c must start at cycle c2 or earlier. This pattern is repeated for pairs of data transfer instructions and compute instructions 255e-f, 255g-h, 255i-j.

For Tile 2, compute instruction 255l depends on data from data transfer instruction 255k. However, instruction 255k does not start immediately at cycle c0. Rather, it has a delayed start at cycle c4. This may be because the data transfer path required by instruction 255k is occupied by some other data transfer instruction and is not available until cycle c4. The start time of instruction 255k in the static schedule is not determined by run-time arbitration or contention mechanisms for the shared data transfer path. Rather, the compiler knows that the data transfer path is occupied since the compiler knows the start times and durations of all the instructions, so the compiler simply creates a static schedule in which instruction 255k does not start until cycle c4 when the compiler knows the data transfer path will be available. Similarly, data transfer instruction 255m has a delayed start time. Perhaps the T2 D pipeline is being used to transfer out the results of computation 255l and does not become available until cycle c5.

For Tile 3, computation 255n starts immediately at cycle c0. Perhaps the required data was loaded into Tile 3 during some prior phase. Data transfer instructions 255o and 255p load data for compute instruction 255q. They are separated in time, perhaps because different pieces of data were not available or the data transfer paths were not available until those times. As a final example, data transfer instruction 255r loads data for compute instruction 255s. In the static schedule, the compiler places instruction 255r well in advance of when the data is required, but this may be because that is when the data transfer path is available or perhaps the data was transferred out of the sourcing Tile in order to make room in that Tile.

Execution of the instructions according to the static schedule at run-time may be implemented in different ways. In one approach, the computer program includes an express schedule for the execution of the instructions. Continuing the example of FIG. 2C, the computer program may specify that instruction 255a executes at cycle c0, instruction 255b at cycle c1, instruction 255c at cycle c2, etc. Alternatively, the compiler may fill each instruction stream with NO-OPs to achieve the correct timing. A NO-OP (no operation) is an instruction that occupies a certain number of cycles without other activity. For example, the compiler knows that instruction 255a will end at cycle c1 and instruction 255b is supposed to begin at cycle c1. It may fill the space between cycles c0 and c1 with NO-OPs for the T1 C pipeline. The T1 C pipeline then just continuously executes instructions from its queue, and the NO-OPs ensure that instruction 255b is executed according to the compiler's static schedule. In yet another approach, the static schedule may be implemented by hardware. The T1 C pipeline may just stall on the execution of instruction 255b until the data from instruction 255a is ready. The compiler knows that data will be ready at cycle c1 and, therefore, instruction 255b will execute starting at cycle c1 even though the Tiles are unaware of the static schedule. Regardless of the implementation, for convenience, all of these situations will be described using the phrase "static schedule." Thus, a statement that the compiler statically schedules the instructions is intended to include all of the above implementations and is not meant to imply that the computer program expressly includes a scheduled time for each instruction.

In order to statically schedule instructions, the compiler typically will know the duration of each instruction (i.e., how long each instruction takes to execute), the capabilities of each Tile (which Tiles can execute which instructions), the topology of data transfer paths to and from Tiles (including between Tiles, and between Tiles and on-chip memory), and the computations required and their dependencies (i.e., the MLN description). With this information, the compiler can schedule unconditional start times for the Tile instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided.

Figure 3A:
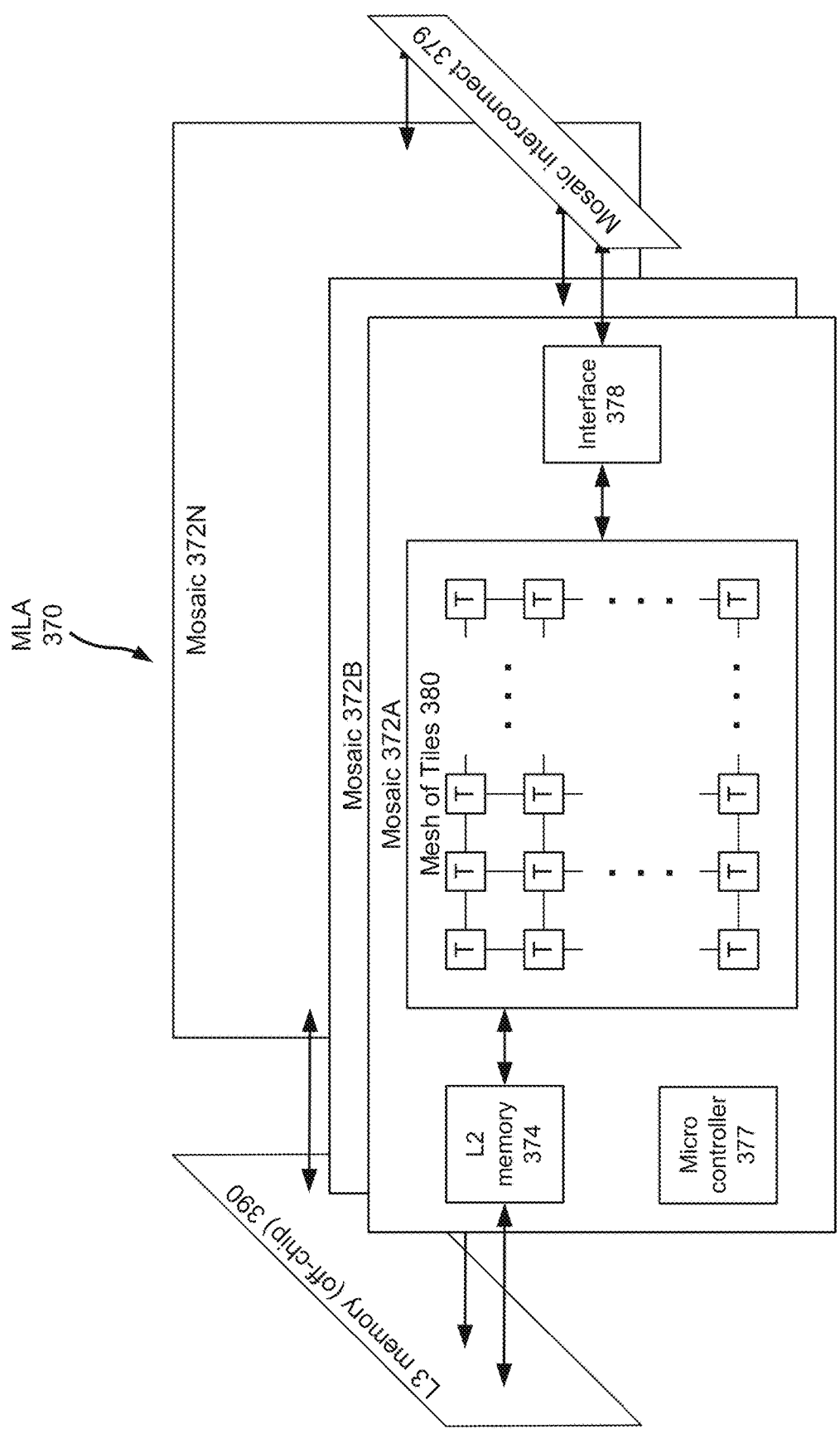
FIG. 3A is a block diagram of a hardware system including an MLA.
Figure 3B:
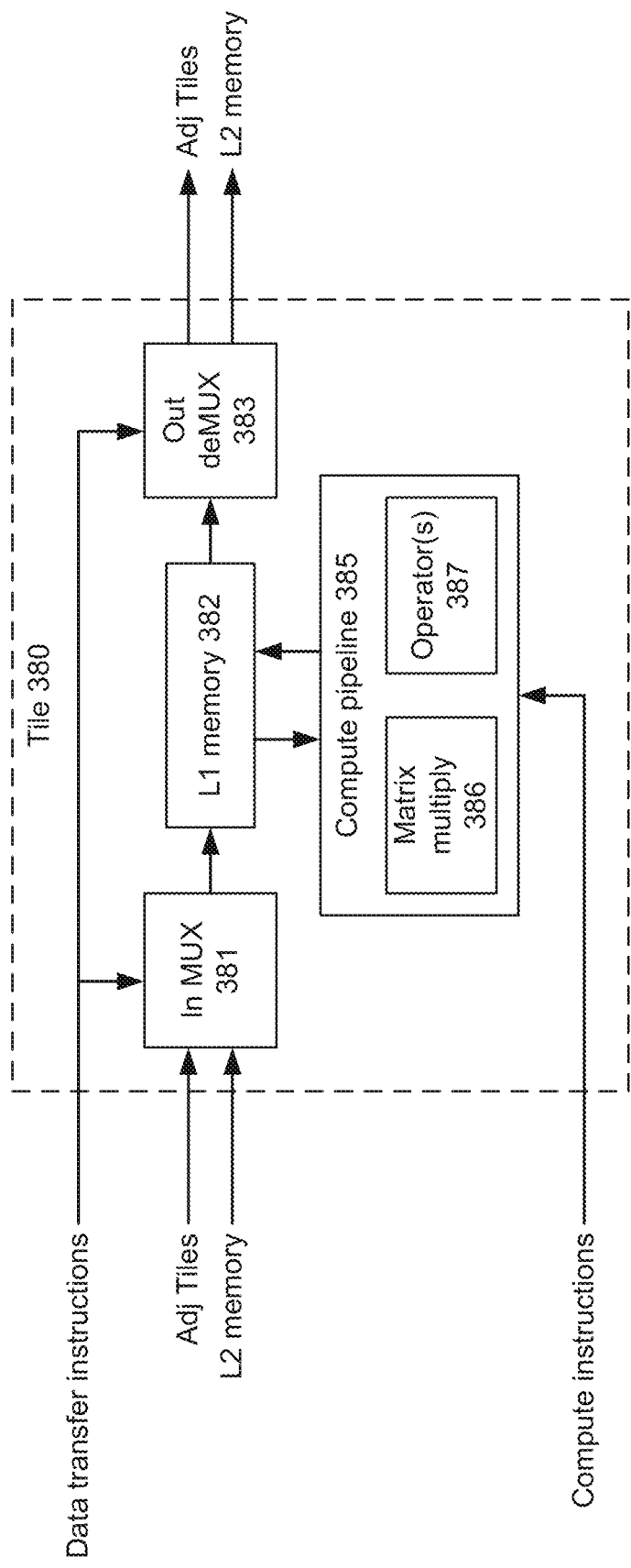
FIG. 3B is a block diagram of a Tile within an MLA.
Figure 3C:
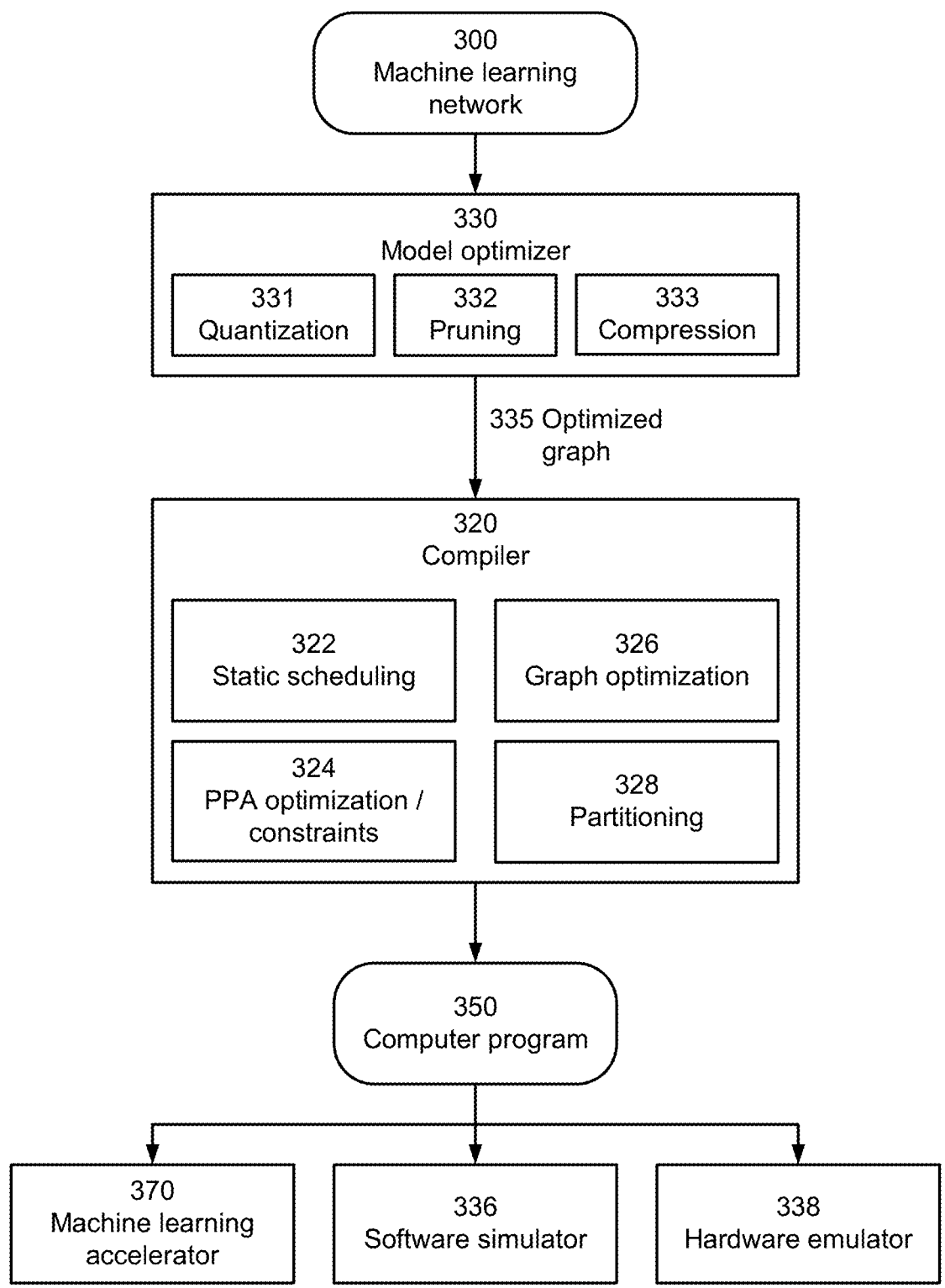
FIG. 3C is a block diagram of a software development environment including an MLN compiler.

FIGS. 3A-3C are more detailed descriptions of an example system that includes an MLA and corresponding compiler. FIG. 3A-3B show the hardware component and FIG. 3C shows the software development environment.

FIG. 3A is a block diagram of a hardware system including an MLA 370. The MLA 370 includes all the components shown in FIG. 3A, except the off-chip L3 memory 390. The MLA components are implemented on a single die as part of a single chip. The MLA 370 includes one or more mosaics 372A-N. In this example, all of the mosaics are the same. Each mosaic 372 includes a mesh of Tiles 380, an on-chip memory system and a controller 377. In FIG. 3A, the on-chip memory system is a multi-level memory system, which includes a level 1 (L1) memory distributed among the Tiles (see FIG. 3B) and a level 2 (L2) memory 374 shared by the Tiles. If there are multiple mosaics 372, the MLA 370 may include a dedicated interconnect 379 for connecting the different mosaics. Each mosaic also includes an interface 378 to the interconnect 379.

FIG. 3B is a block diagram of a Tile 380 within the MLA. In this example, all the Tiles are the same. Each Tile 380 includes an L1 memory 382. Each Tile 380 also includes a data transfer pipeline that executes instructions for transferring data to and from the L1 memory 382. Here, the Tiles 380 are arranged in a rectangular array as shown in FIG. 3A, with each Tile connected to its adjacent neighbors. Interior Tiles are connected to four adjacent Tiles. Edge Tiles are connected to adjacent Tiles and also to L2 memory 374. In FIG. 3B, the L1 memory 382 may receive data from any of its adjacent Tiles and/or from L2 memory if it is an edge Tile. Similarly, it may transfer data to any of its adjacent Tiles and/or to L2 memory if it is an edge Tile. The data transfer operations are controlled by data transfer instructions received and executed by the Tiles.

Each Tile 380 also includes a compute pipeline 385 for executing computations using data stored in the L1 memory 382. The L1 memory acts as software-configurable registers for the compute pipeline 385. The compute pipeline 385 includes matrix multiplication circuitry 386, such as a systolic array, and circuitry for implementing different types of operators 387. The computations are controlled by compute instructions received and executed by the Tiles.

In this particular example, all of the data transfer instructions and compute instructions executed by the Tiles are statically scheduled. These instructions include data transfer between L1 memories in different Tiles, and data transfer between L1 memory and L2 memory. Data transfer instructions may specify one hop at a time (e.g., transfer data to the east neighbor Tile) or may specify destination and path through intermediate Tiles (e.g., transfer data to Tile (5,5) using path east-east-north-north-east). The instructions also include matrix multiplies performed by the Tiles and operators applied by the Tiles. These operations do not require very many different instructions to implement, so the overall instruction set may be fairly small, for example not more than 20 instructions, or not more than 50 instructions.

The L3 memory 390 is off-chip. In this example, the L1 and L2 memories are implemented as on-chip SRAM and the L3 memory is implemented as DRAM (flash memory and SSD drives are other alternatives). Because the L1 and L2 memories are implemented as SRAM, the data transfers between L1 memories or between L1 and L2 memories have deterministic timing, so these data transfer instructions can be statically scheduled by the compiler. However, data transfer from off-chip DRAM is more unpredictable in timing. As a result, these instructions are non-deterministic in nature and they are executed by the microcontroller 377. Therefore, they are not statically scheduled.

In one approach, the instructions in the computer program and the data required for computation (e.g., input, weights, biases, parameters for operators) are initially loaded into L3 memory 380. From time to time, instructions and associated data are transferred from L3 memory into L1/L2 memory. Once these instructions and data are loaded into L1/L2 memory, the Tiles execute the loaded instructions according to a static schedule. Data may be continuously streamed into the L1/L2 memory, with the corresponding statically scheduled instructions consuming that data. In one approach, the Tiles execute only statically scheduled instructions, and all non-statically scheduled instructions are executed by processing elements outside the Tile mesh, for example, the microcontroller 377.

SRAM has predictable timing so implementing the L1 and L2 memories as SRAM allows the compiler to statically schedule data transfers from those memories into the Tiles for computation. However, there is a limit to the amount of SRAM that may be implemented on a die. In order to increase the effective size of SRAM, a virtual SRAM approach may be used. In one approach, the compute instructions that consume certain data are not fetched into the Tiles until after the corresponding data have been transferred from DRAM (L3 memory) to SRAM (L1/L2 memory). This guarantees that the compute instructions will not be executed by the Tiles before the data is available. All data effectively will appear as if it is transferred to the Tiles from SRAM for computation, even if all of the data would not fit into the available SRAM.

L2 memory may also be used to temporarily store interim values that are too voluminous to store in L1 memory. For example, a layer K of the MLN may produce a large amount of data at its output, to be used as input to the next layer K+1. The layer K output may be stored in L2 memory and then retrieved from L2 memory as needed for the next layer's computations.

FIG. 3C is a block diagram of a software development environment including an MLN compiler 320. In this example, the software development environment also includes a model optimizer 330. The model optimizer 330 receives a description of the MLN 300 and produces an optimized graph 335 of the MLN. It may apply optimizations such as quantization 331, pruning 332 and/or compression 333. Quantization 331 reduces the resolution of calculated values. For example, floating point values may be quantized to a certain number of bits and then integer math used instead of floating point math. This reduces the complexity and power consumed by the Tiles. Pruning 332 removes parts of the MLN that do not contribute significantly to the overall results. For example, if certain weights are zero or close to zero, those weighted interconnects may be pruned. Finally, because MLNs contain a large amount of data, compression may be used successfully to reduce data transfer bandwidths.

The resulting optimized description 335 of the MLN may be expressed as a graph, in which the nodes of the graph represent nodes in the MLN and the edges of the graph represent the weighted interconnects. The compiler 320 receives the optimized graph 335 and produces the resulting computer program 350. The compiler 320 may perform operations including static scheduling 322, PPA (power performance area) optimizations 324, graph optimizations 326 and/or partitioning 328. Static scheduling 322 of the appropriate instructions was described above.

PPA optimization 324 includes different optimizations of the computer program 350. For example, the allocation of MLN computations to Tiles may be optimized to reduce power consumption, to increase performance (such as reducing latency or increasing throughput) and/or to reduce area (e.g., number of Tiles used).

For a given graph representation of an MLN, the number of computations required to execute the MLN is fixed. As a result, in one approach, the compiler may optimize to increase the utilization of compute resources in the Tiles—to keep the compute pipelines as busy as possible. However, for a Tile to execute a computation, the data for that computation must be available. This means that any prior computations must be completed and that those results must be transferred to the Tile doing the next computation. Thus, rather than focusing on computations, the compiler may optimize with respect to data transfer to reduce the wait times of computations. It may also allocate computations to Tiles in order to reduce data transfers between Tiles in the same mesh, to reduce data transfers from outside the MLA and/or to reduce data transfers that cross the boundary of the mesh (e.g., reducing data transfers between L1 and L2 memory and trying to keep all data in L1 memory).

The compiler 320 may also optimize 324 the computer program 350, subject to constraints on power, performance, area and/or any of the quantities described above. Graph optimization 326 includes analysis of the graph representing the MLN to prune, merge or quantize links, parameters, values, and layers to achieve better performance. Partitioning 328 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

The resulting computer program 350 may be loaded into memory for execution on a machine learning accelerator 370. For example, one possible application is object detection. In this case, the inputs are images captured by a video camera. The MLN 300 has been trained to identify certain objects in the video images. The computer program 350 implementing the MLN is loaded onto memory that is accessible by the MLA 370, which is implemented as a chip inside the camera. This way, images captured by the video camera may be immediately analyzed by the computer program 350 running on the MLA 370.

In addition to the MLA 370, the computer program 350 or parts of it may be run on a software simulator 336 and/or hardware emulator 338 (including FPGAs configured as MLAs). These may be used for product development, debugging and/or prototyping.

The approach based on static scheduling described above is not restricted to the examples described above. For example, different network topologies of Tiles may be used. Other Tile meshes may also be statically scheduled, so long as the time required to execute computations and to transfer data between Tiles may be determined at compile time.

Returning to the flow of FIG. 1, FIGS. 4-7 provide a simplified example. In this example, the input and output tensors are the same size and have the same split (3,4,1). The spatial dimensions are partitioned into 3×4=12 slices. The channels are not split and, as a result, will not be shown in the following example. For each channel, the output tensor is a convolution of the input tensor. The MLA includes a 6×6 array of PEs, and 12 of the PEs are used to calculate this convolution.

Figure 4A:
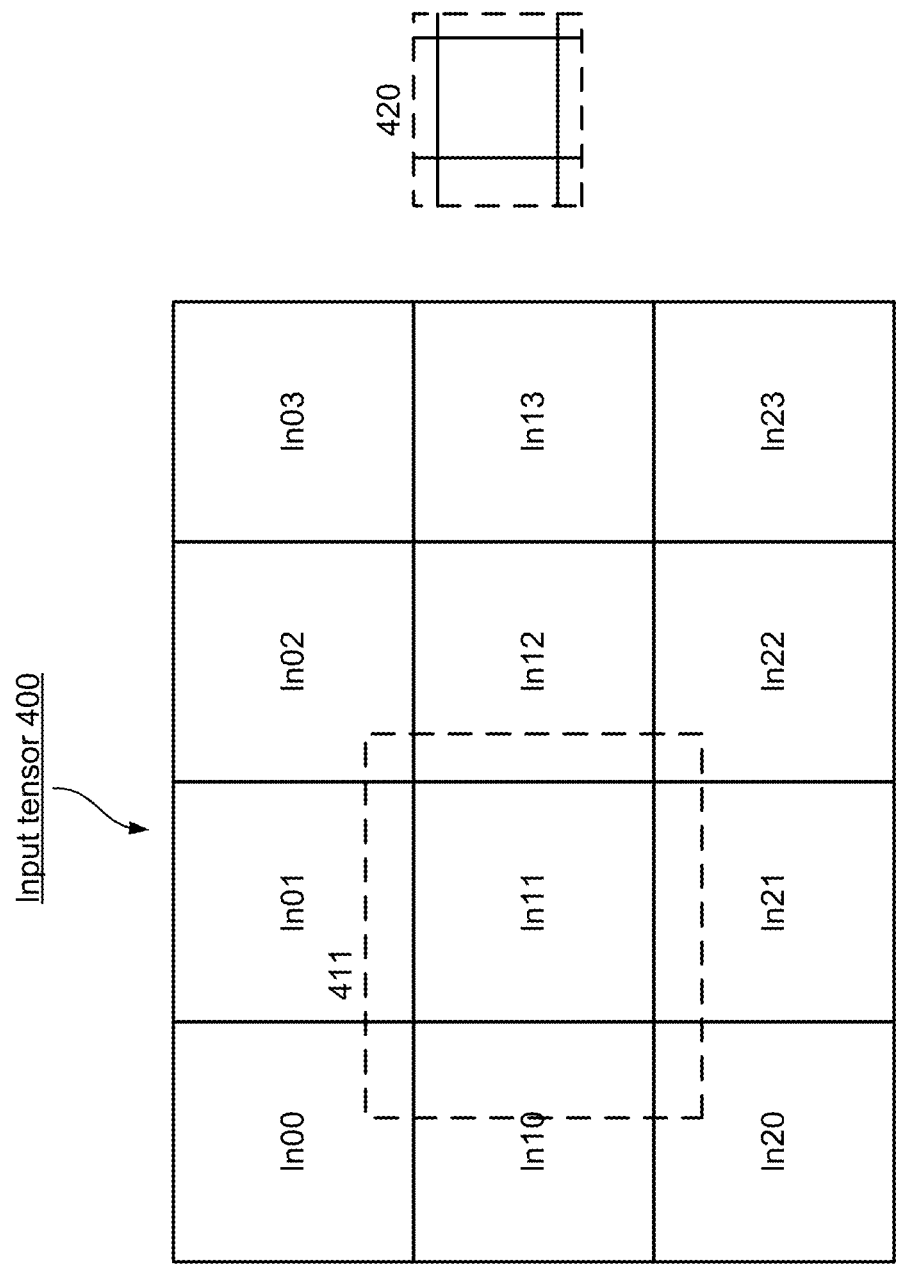
FIG. 4A is a logical layout of an input tensor showing partitioning into slices.

FIG. 4A is a diagram of the input tensor 400. It is partitioned into 12 slices labelled In00-In23, and each slice is the same size. The output tensor is the same size as the input tensor and is also partitioned in the same way into 12 slices Out00-Out23. Therefore, there is a one-to-one correspondence between input slices Inpq and output slices Outpq. The dashed rectangle 411 shows the data needed to calculate the convolution for output slice Out11. The convolution uses data from the corresponding input slice In11 and also from each of the eight neighboring slices In00, 01, 02, 10, 12, 20, 21, 22. The set of inputs slices used to compute an output slice is referred to as the support for that output slice. Because the operation in this example is a convolution, the support for each output slice is the same size and shape, except for edge effects. The symbol 420 is a representation of this support.

Figure 4B:
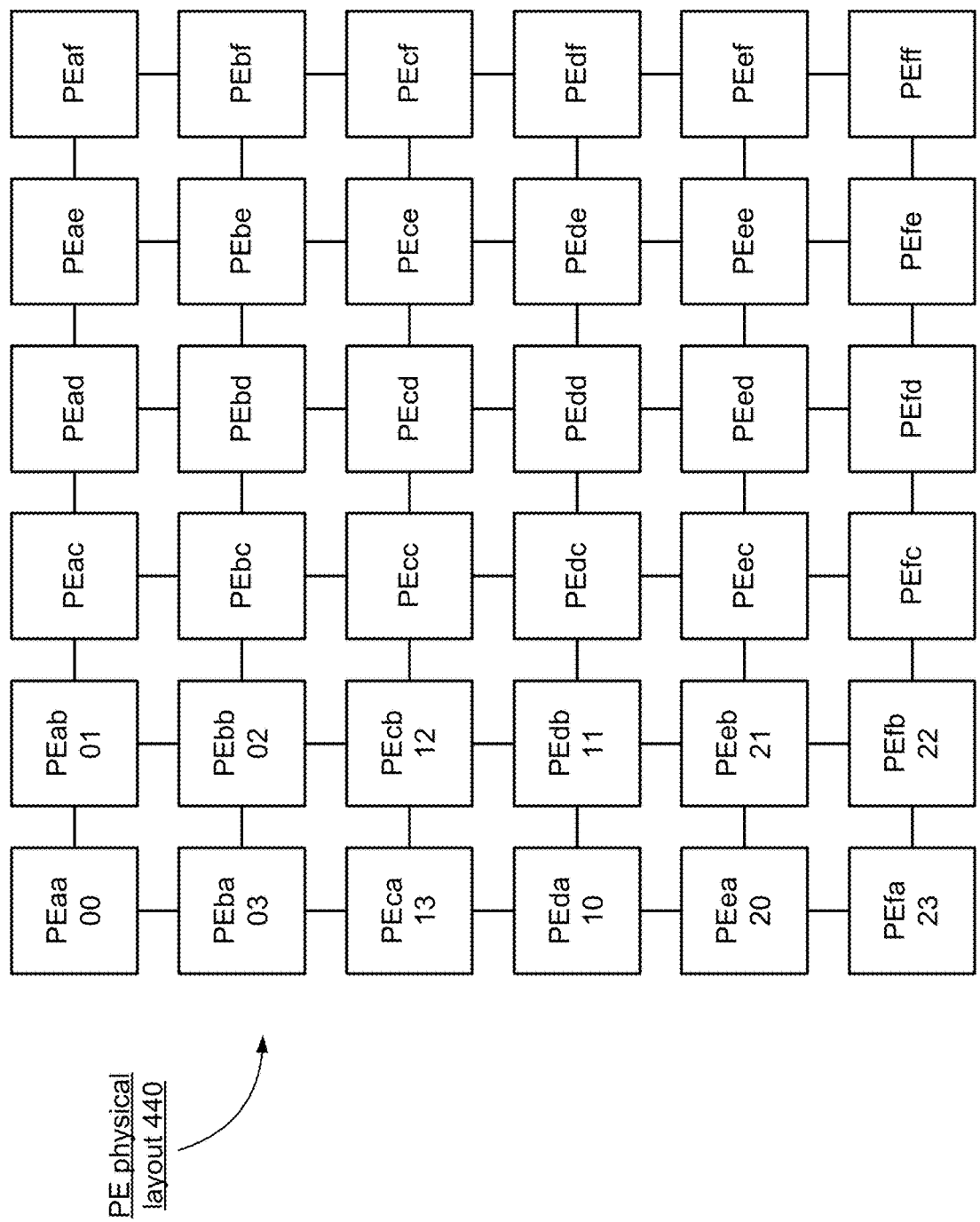
FIG. 4B is a physical layout of PEs, with allocation of slices to processing elements (PEs).

FIG. 4B shows a physical layout 440 of the 6×6 array of PEs, which are labelled aa-ff. Adjacent PEs are connected by data transfer paths, as indicated by the lines between PEs. FIG. 4B also shows the allocation of slices to PEs, as indicated by the two digit numbers in some PEs. Slice 00 is allocated to PEaa, slice 01 is allocated to PEab, slice 02 is allocated to PEbb and so on. In this example, the input slices and corresponding output slices are allocated to the same PE. That is, input slice In00 is allocated to PEaa and output slice Out00 is also allocated to PEaa. Accordingly, PEaa may be referred to as PE00. The suffix aa refers to the physical layout of PEs, and the suffic 00 refers to the logical layout of PEs. PE00 may also be referred to as a logical PE.

Figure 4C:
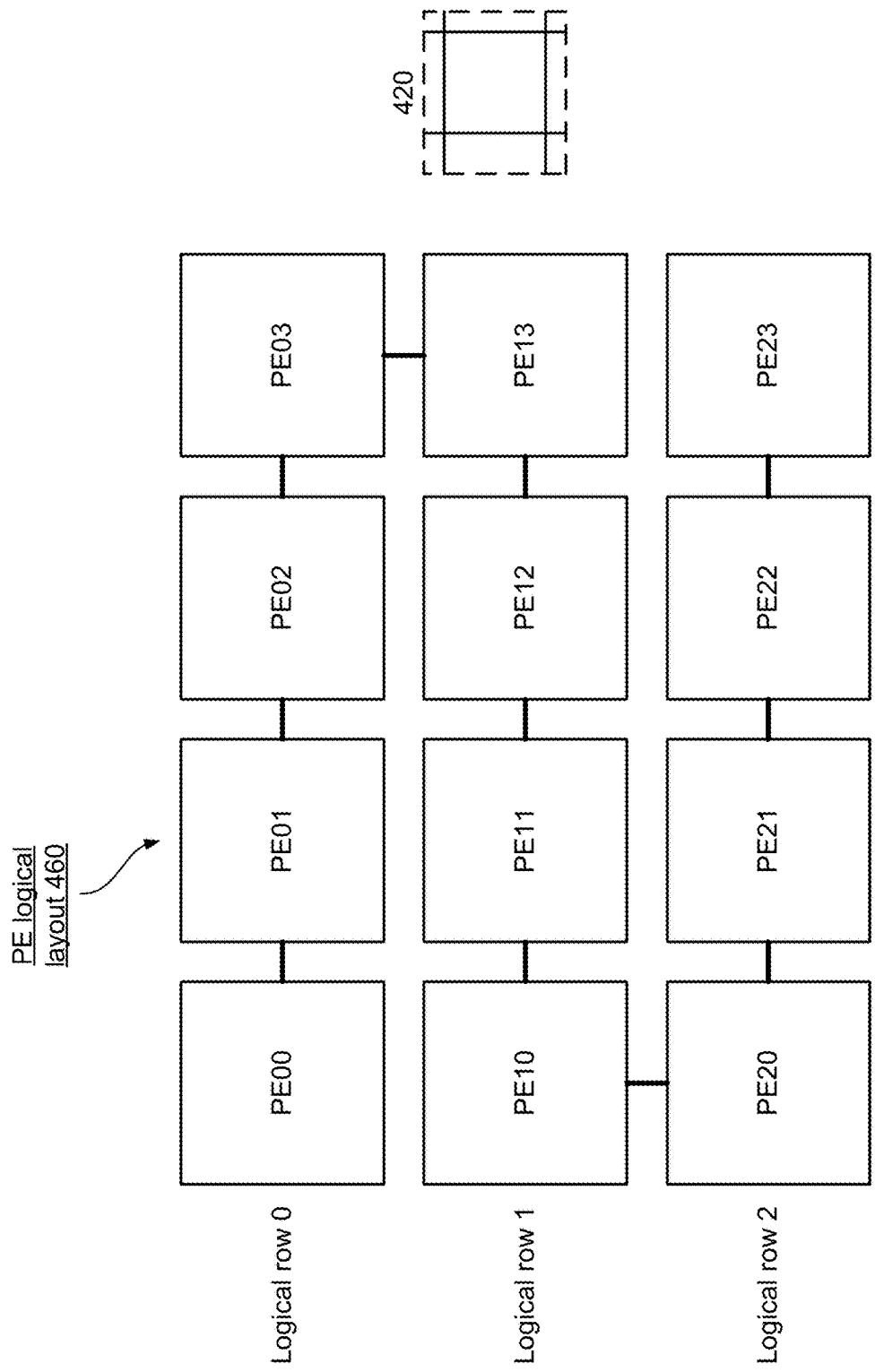
FIG. 4C is a logical layout of PEs overlaid with physical data transfer paths.
Figure 4D:
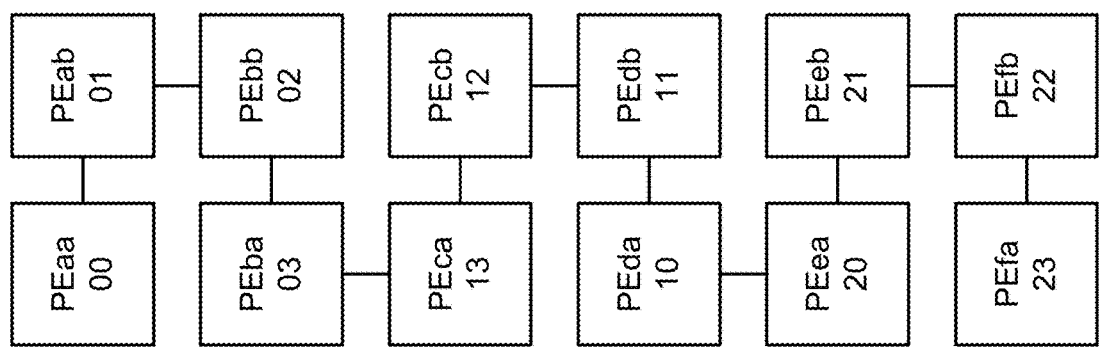
FIG. 4D is a physical layout of an MLA showing only the PEs and data transfer paths from FIG. 4C.

FIG. 4C combines the information in FIGS. 4A and 4B. The 3×4 array is the logical layout 460 of PEs. The boxes represent the input slices, the logical PEs and the output slices. For example, the box labeled PE00 represents logical PE00 (which is physical PEaa), and PE00 stores input slice In00 and will compute and store output slice Out00. The lines between boxes represent the available data transfer paths between PEs. There are more data transfer paths than shown, but FIG. 4C shows the paths of interest for this example. Not all logical PEs are necessarily connected to their neighbors, because the corresponding physical PEs may not be neighboring. For example, there is no data transfer path between logical PE00 (physical PEaa) and logical PE10 (physical PEda), because physical PEaa and PEda are not neighbors. FIG. 4D is the same as FIG. 4B, but it shows only the PEs shown in FIG. 4C and only the data transfer paths shown in FIG. 4C. FIG. 4D is the physical layout corresponding to the logical layout of FIG. 4C. The PEs are connected in a continuous path from PE00 (PEaa) to PE22 (PEfb).

As shown in FIG. 4C, the slices are allocated to PEs in a manner that forms logical rows, where the logical PEs in a logical row are connected to each other. In logical row 0, PE00 to PE03 are connected, and the same is true for logical row 1 (PE10 to PE13) and for logical row 2 (PE20 to PE23). There are also connections between logical rows. Logical rows 0 and 1 are connected on one end between PE03 and PE13, and logical rows 1 and 2 are connected on the opposite end between PE10 and PE20.

To compute Out11, data from the eight neighboring PEs in FIG. 4C are transferred to PE11 using the data transfer paths shown in FIG. 4C. A similar situation applies to each of the other output slices, and the data transfers for all output slices are coordinated to occur in parallel and without conflict.

Figure 6A:
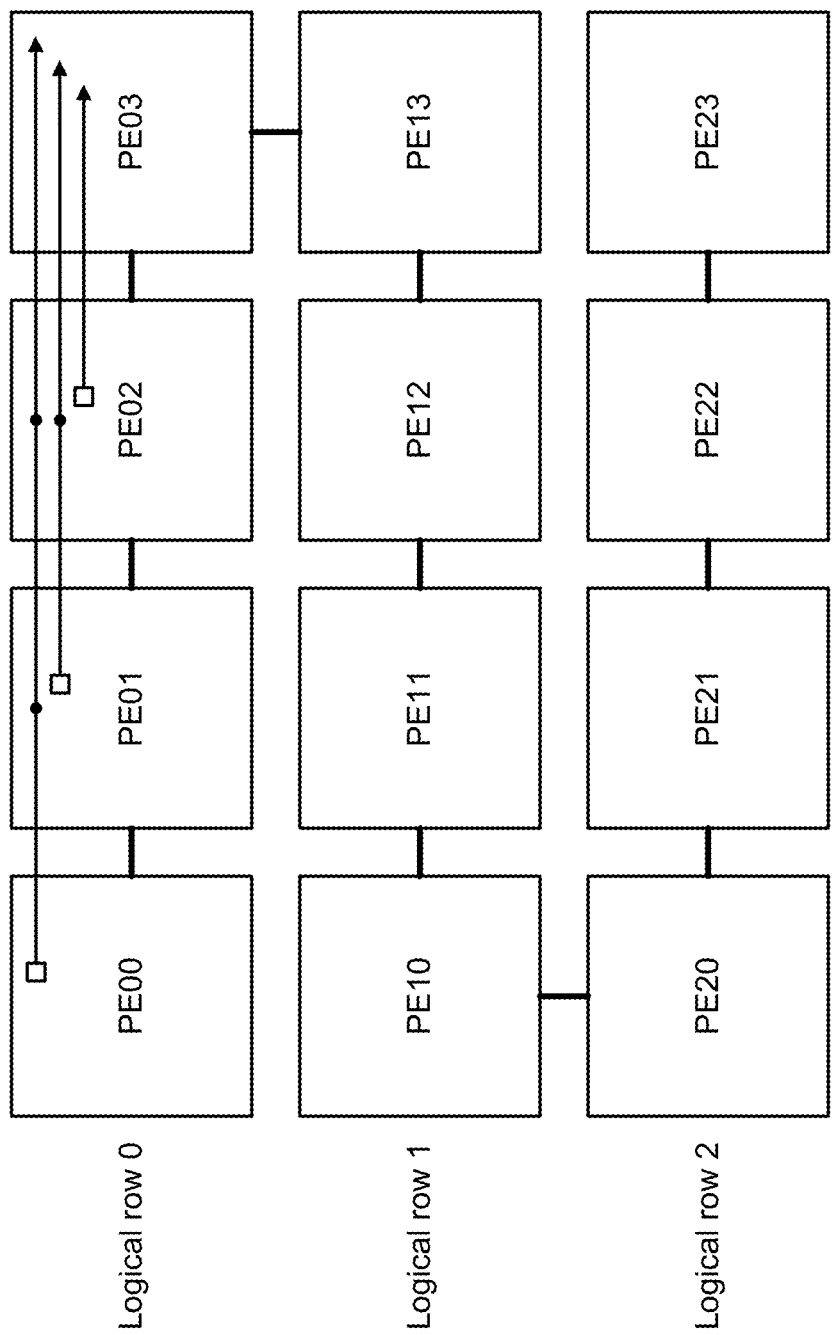
FIGS. 6A-6D show one implementation of inter-row data transfers from a higher row to a lower row.
Figure 6B:
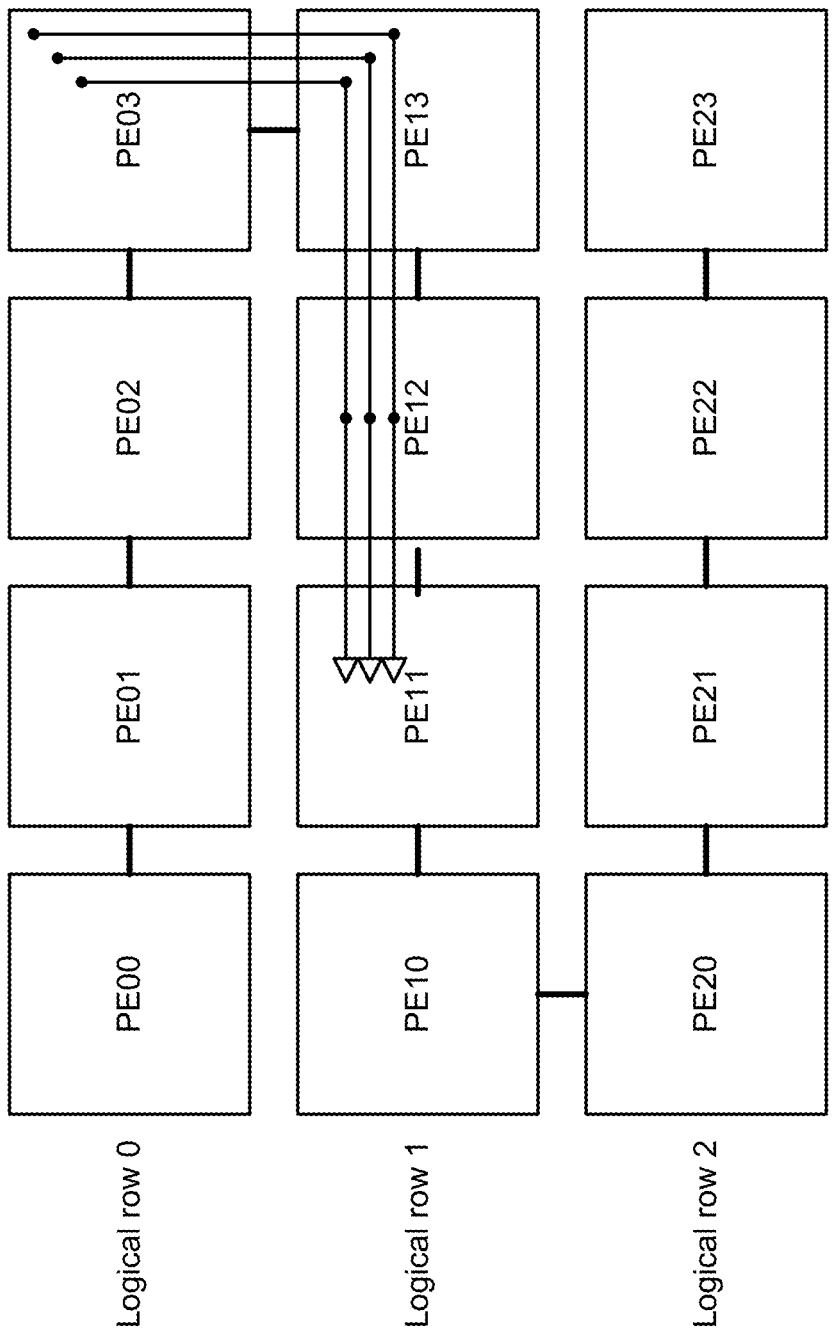
Figure 6C:
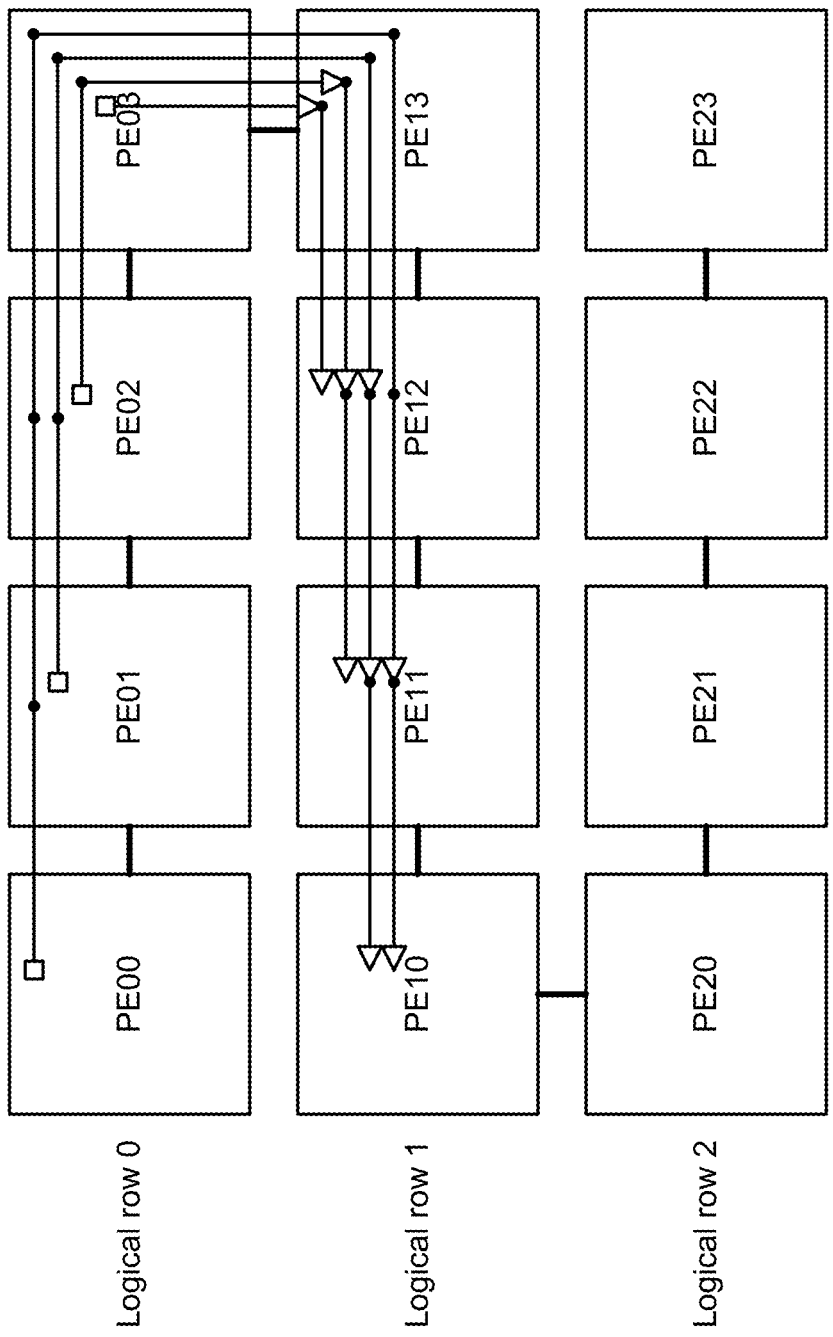
Figure 6D:
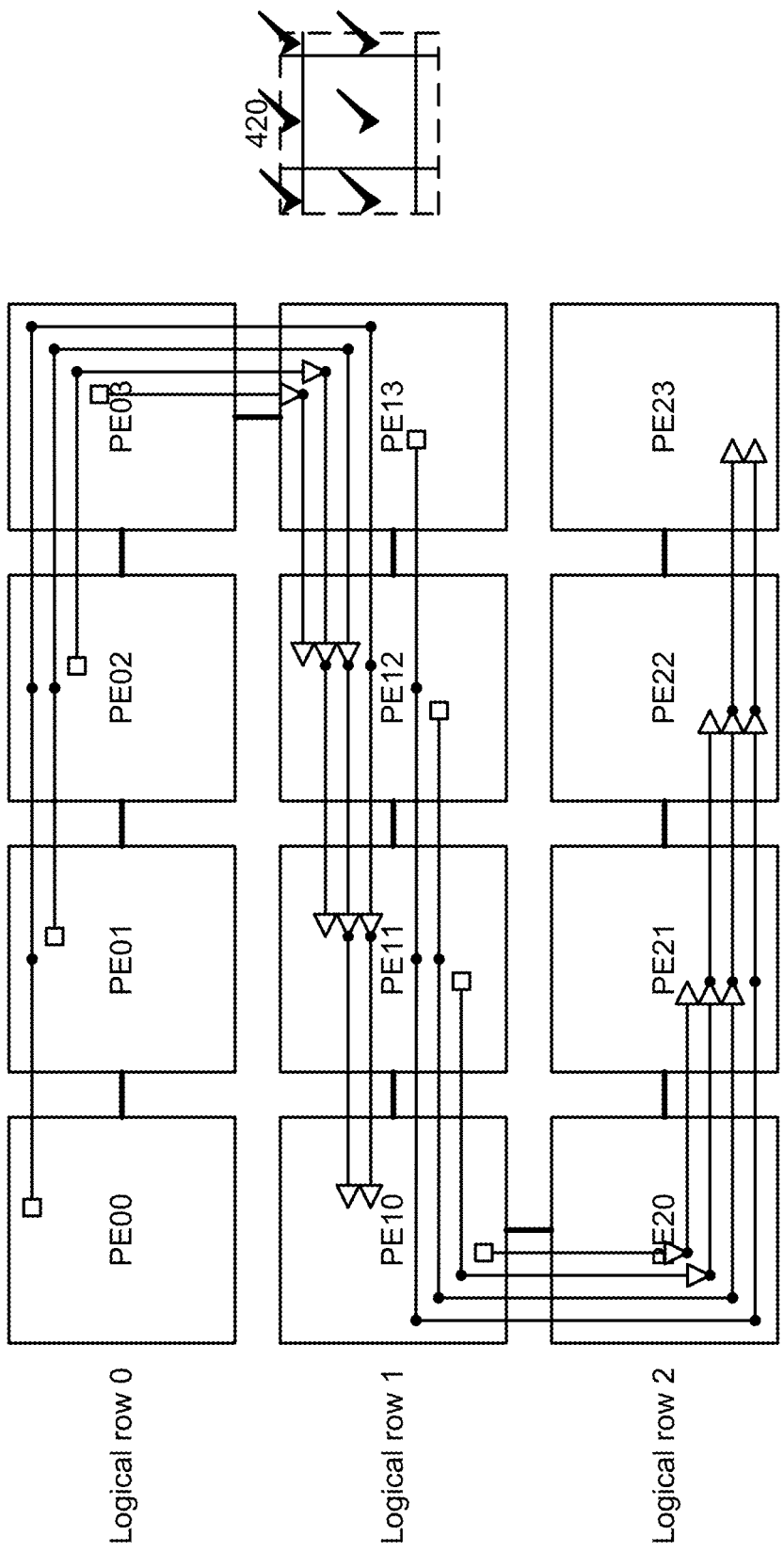
Figure 7:
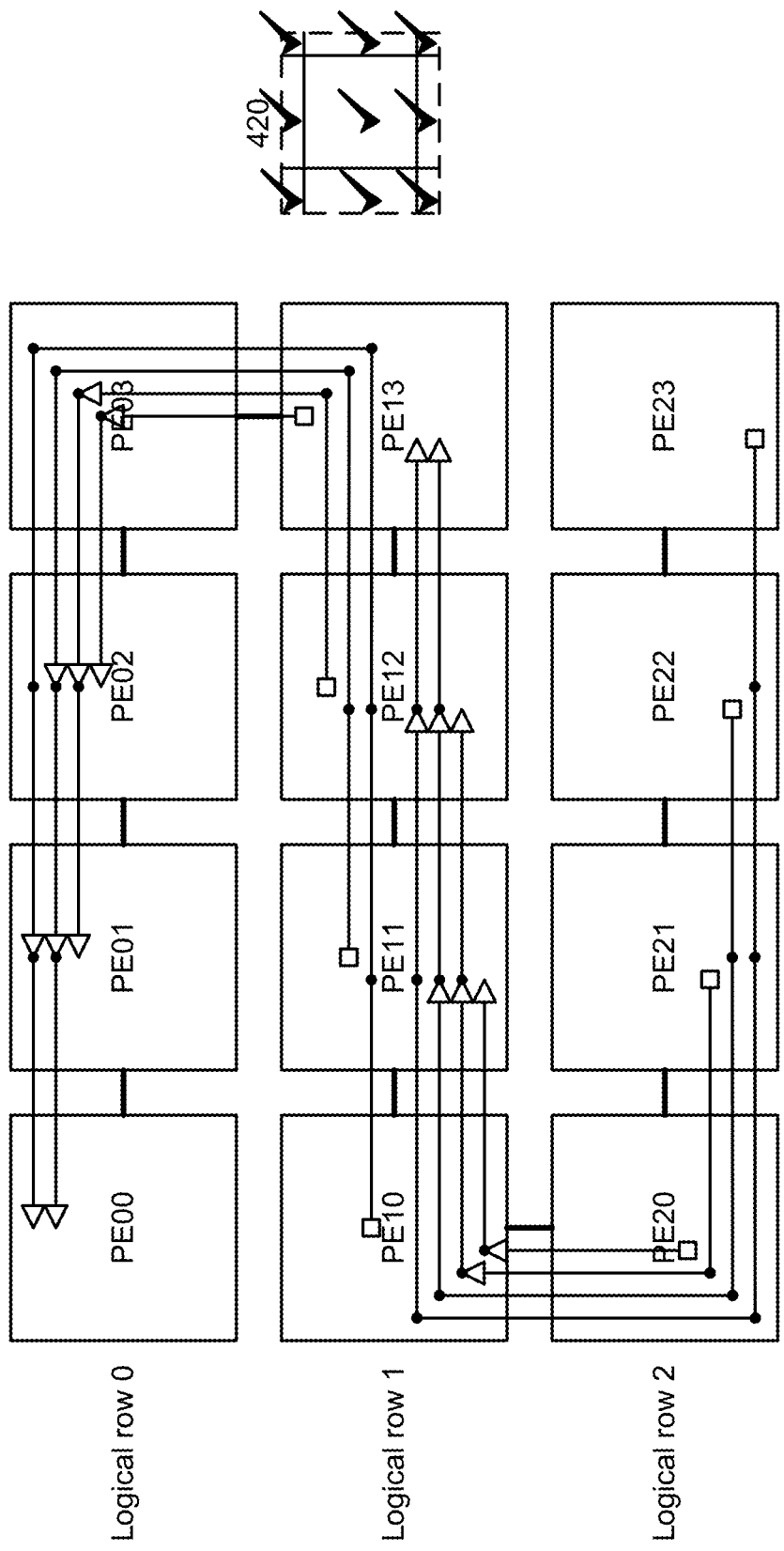
FIG. 7 show inter-row data transfers from a lower row to a higher row.

One approach is shown in FIGS. 5-7. In these figures, the source of data is marked by an open square, and the destination(s) of the data are marked by an open arrowhead. FIGS. 5A-5C show data transfers within a logical row. FIG. 5A shows a "self-copy" instruction. Out11 uses data from In11, and both Out11 and In11 are allocated to PE11, so the data from In11 is already stored at PE11. In some cases, In11 and Out11 may be stored at different addresses of PE11's local memory (L1 memory in FIG. 3B), so there may be a transfer or copying of data within PE11. The support symbol 420 has a check in the center box because the data from In11 is now available for computation of Out11. The same instructions are executed concurrently by the other PEs.

Figure 5A:
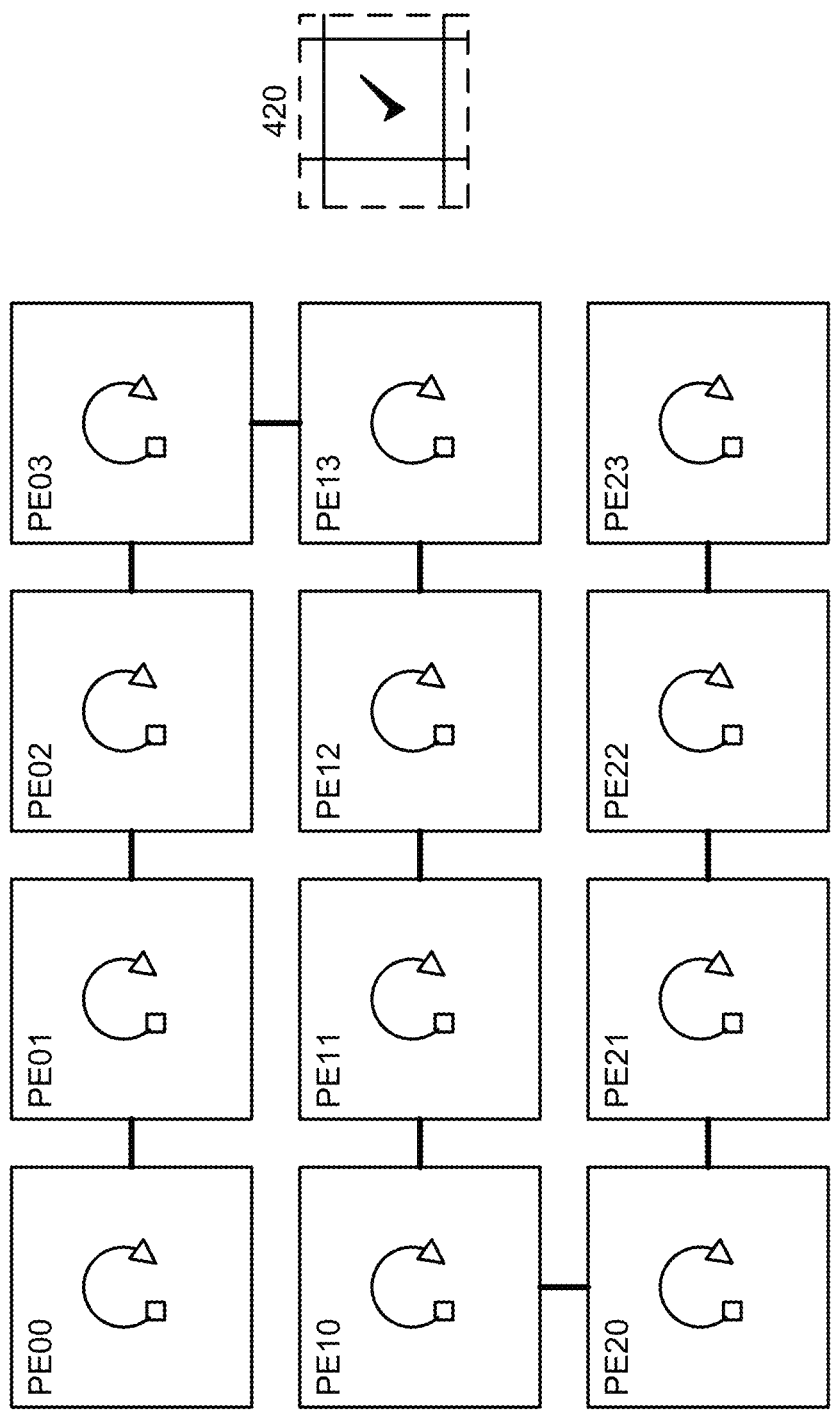
FIG. 5A shows a self-copy instruction.
Figure 5B:
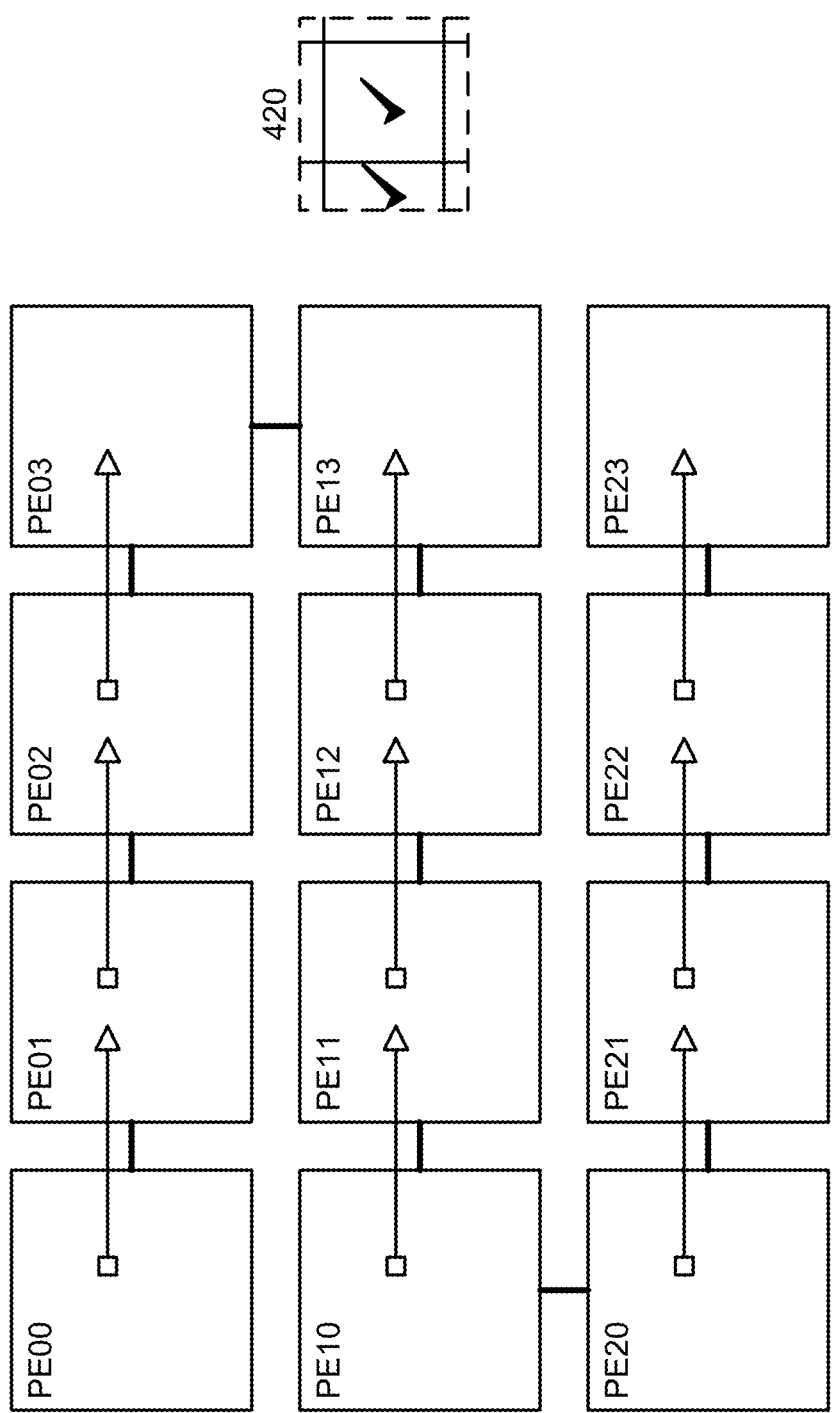
FIGS. 5B-5D show intra-row shift instructions.
Figure 5C:
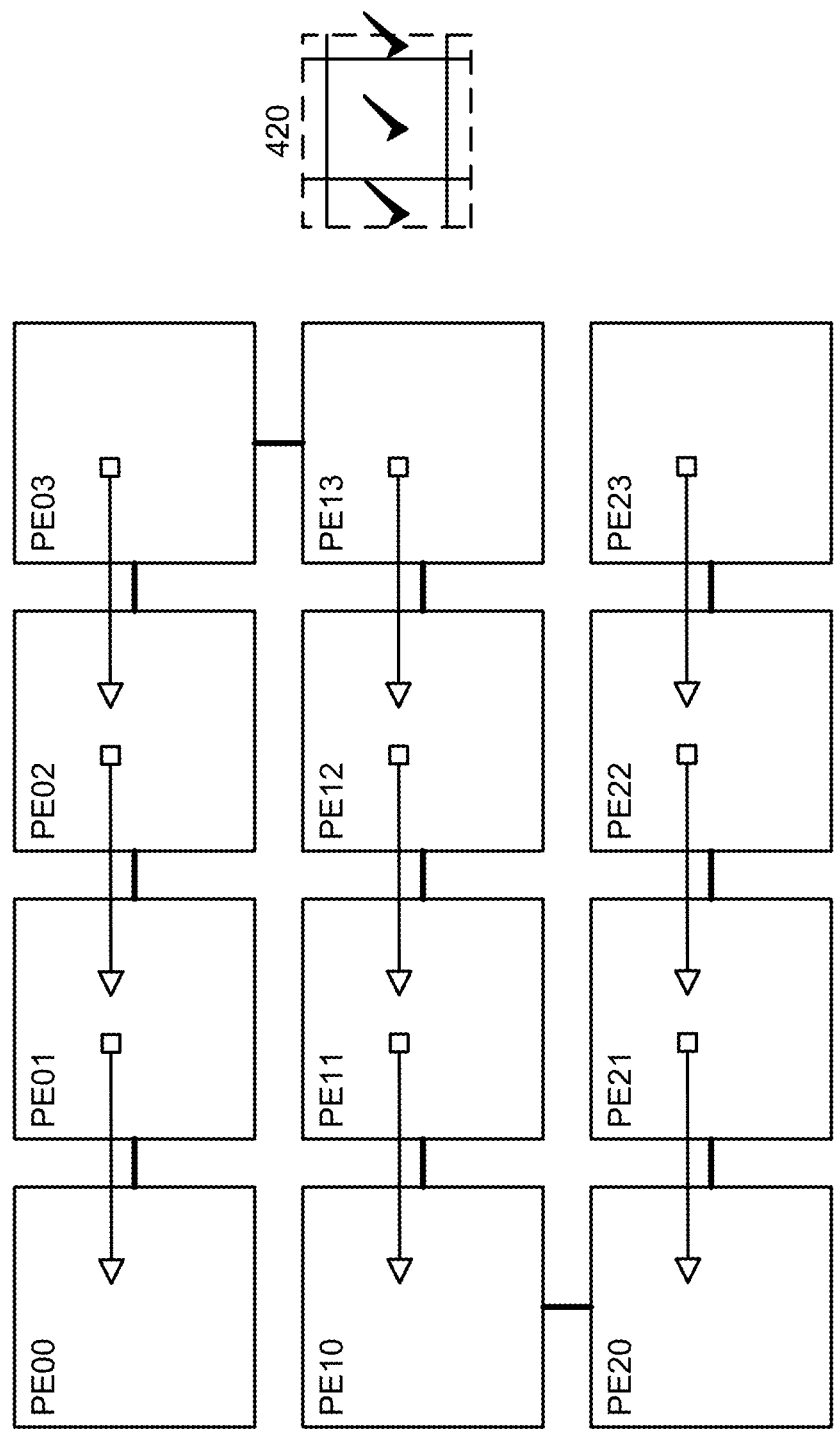

FIGS. 5B and 5C show intra-row shifts. FIG. 5B shows a shift right. This transfers In10 data from PE10 to PE11, so the center left box of the support symbol 420 is checked. FIG. 5C shows a shift left. This transfers In12 data from PE12 to PE11, so the center right box of the support symbol 420 is checked. The same instructions are executed concurrently by the other PEs. Because all PEs in a logical row are shifting in the same direction concurrently, there are no routing conflicts and these intra-row transfers may occur in parallel.

Figure 5D:
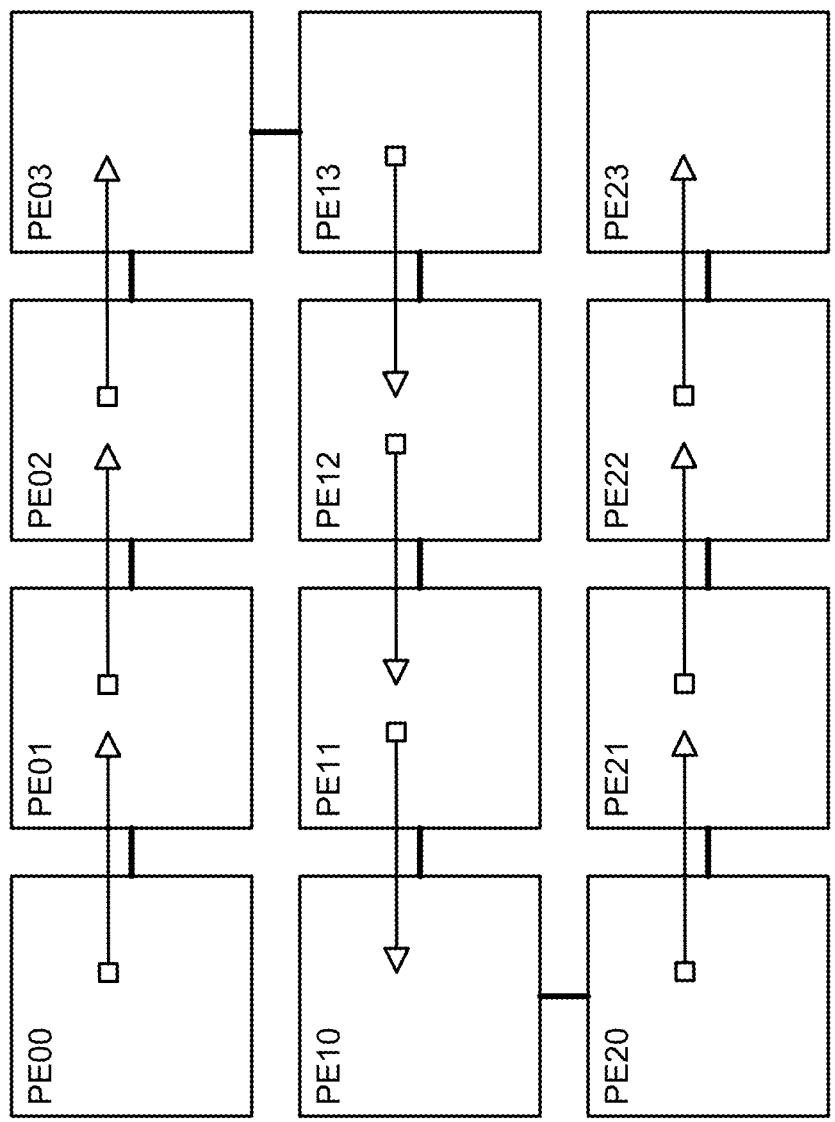

In FIGS. 5B and 5C, all PEs shift right and then all PEs shift left. FIG. 5D shows an alternative approach that follows the data transfer paths. In this example, the data transfer paths form a continuous path from PE00 to PE23 through all 12 PEs. Rather than having all PEs shift right and then shift left, the compiler may schedule instructions so that all PEs shift along one direction of the path and then in the opposite direction. Call these shift A and shift B. FIG. 5D shows shift A, which is a right shift for the even rows and a left shift for the odd rows. Shift B would be the opposite, a left shift for the even rows and a right shift for the odd rows. Regardless of whether right/left shifts or A/B shifts are used, at the end of these intra-row shifts, each PE will have received data from all supporting PEs in the same logical row. Additional shifts may be executed if the support includes more than just the right and left neighbors.

For supporting PEs located in other logical rows, inter-row transfers are executed. For Out11, these are transfers from row 0 to row 1, and from row 2 to row 1. FIGS. 6A-6B show the inter-row transfers from supporting slices in row 0 to Out11 in row 1. The computation of Out11 uses In00, In01 and In02. In FIG. 6A, as shown by the arrows, this data is first transferred intra-row to a collection point, which is the end PE03. In FIG. 6B, this data from multiple slices (In00, 01,02) is transferred to Out11.

FIG. 6C shows the inter-row transfer of slices from row 0 to row 1, for all of the output slices allocated to row 1, not just Out11. Input slices may be transferred to more than one destination PE. For example, In01 is transferred from PE01 to PE12,11,10 as indicated by the three open arrows along that path. In one approach, each PE-to-PE data transfer is scheduled so that all data transfers between two PEs occurs at the same time. For example, the row-to-row transfer from PE03 to PE13 occurs concurrently for all slices after all slices have been collected at PE03, rather than sequentially as each slice arrives at PE03. FIG. 6C transfers all relevant data from input slices in row 0 to output slices in row 1.

FIG. 6D adds the analogous data transfer instructions to transfer data from input slices in row 1 to output slices in row 2. For these transfers, the collection point is the left PE10 because the row-to-row data transfer path is between PE10 and PE20. This checks the top three boxes of the support symbol 420.

FIG. 7 shows the analogous inter-row transfers from a lower row: row 2 to row 1, and row 1 to row 0. At the end of these transfers, the bottom three boxes of the support symbol 420 are checked.

After FIG. 7, all supporting input data has been transferred to PE11 (and to all other PEs) so computations for the output tensor may be completed. The computations can start before all the data transfers are completed. For example, computations for Out11 using In11 may be integrated into the self-copy instruction of FIG. 5A, or may be executed concurrently with any of the other data transfers shown. PE11 may perform whatever computations are possible with the currently available data without having to wait for other data transfers to complete.

In addition, the data transfers in FIGS. 5-7 are shown separately for purposes of explanation. However, they may be performed concurrently or combined if sufficient resources are available. For example, the intra-row shifts of FIG. 5D are consistent with the intra-row collection and distribution of FIG. 6D. These may be combined if the data transfer paths have sufficient bandwidth.

Figure 8:
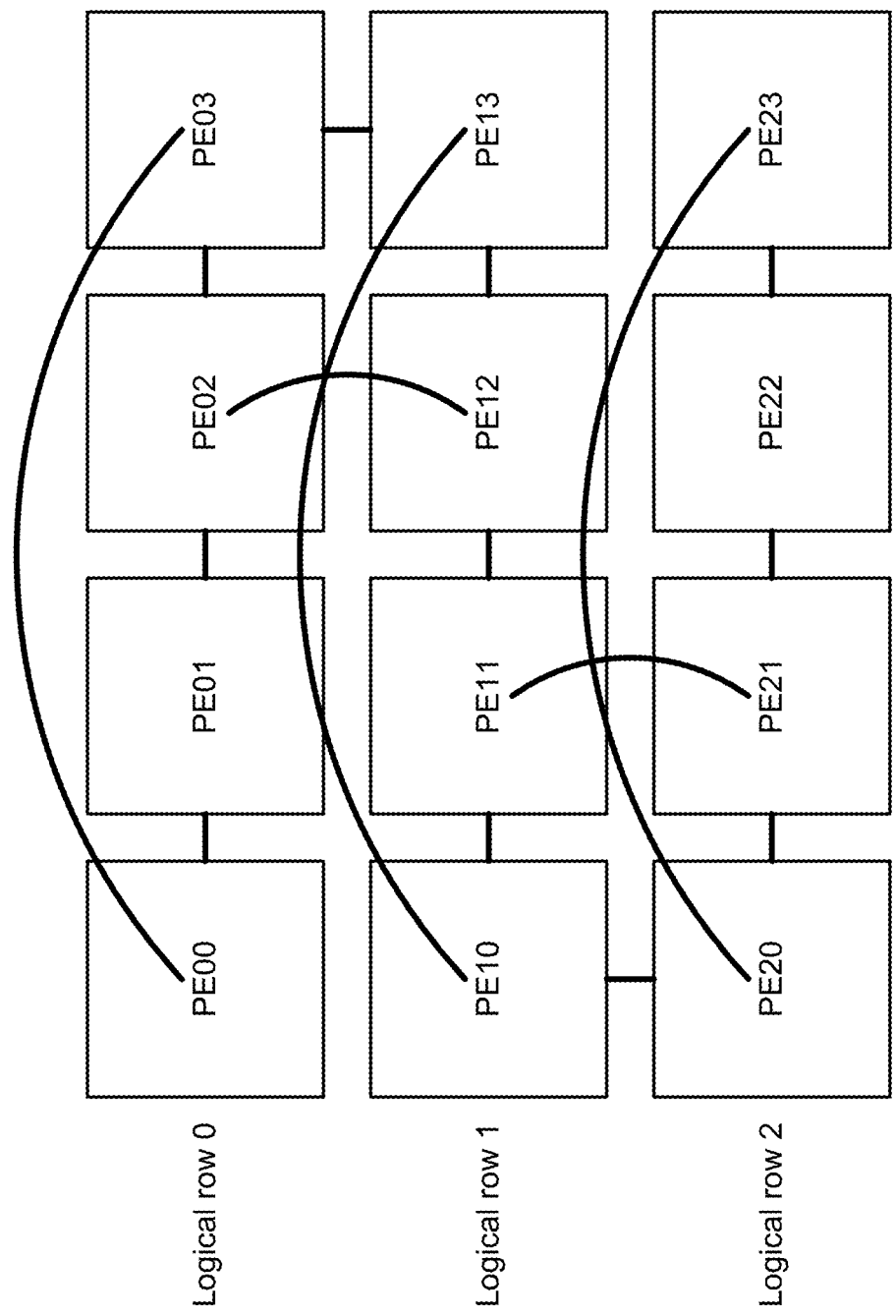
FIG. 8 is a logical layout of PEs overlaid with all physical data transfer paths.

In addition, the above example used only one data transfer path between logical rows, located at the end of each row. Depending on the allocation of slices to PEs, there may be more data transfer paths between rows, and the compiler may make use of these also. FIG. 8 is the same as FIG. 4C but showing all of the data transfer paths available from the allocation of FIG. 4B. These extra data transfer paths may also be used. For example, the path between PE02-PE12 may be used for row-to-row transfers in addition to or in place of the path between PE03-PE13. The path from PE00-PE03 may allow for faster transfer of data between those two PEs, avoiding the intermediate PE01,02.

Figure 9A:
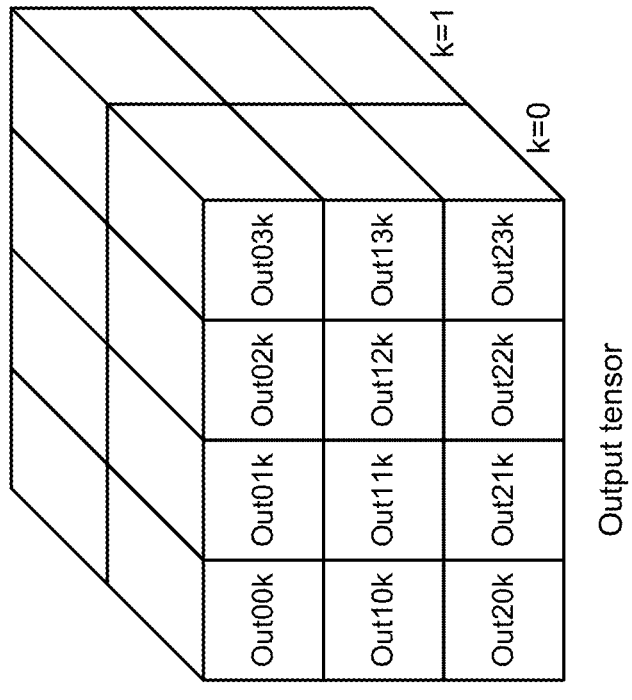
FIG. 9A shows an input tensor and output tensor with different channel partitions.
Figure 9A:
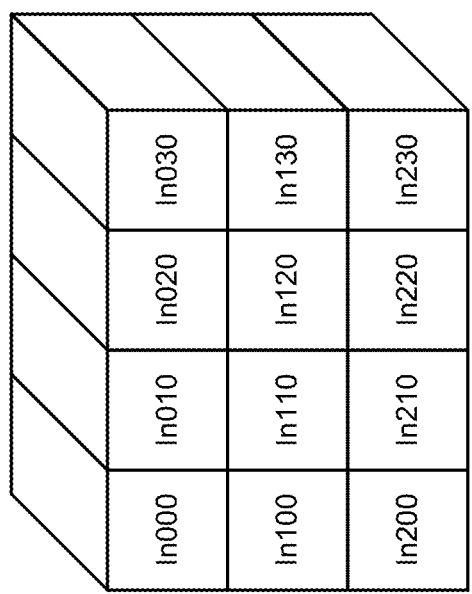

In the above examples, neither the input tensor nor the output tensor was partitioned in the channel dimension. FIGS. 9 and 10 show situations where the input tensor and output tensor have different channel partitions. In FIG. 9A, the output tensor has twice as many channels as the input tensor. The size of each channel slices is the same but, because of the difference in number of channels, the input tensor has 1 channel slice (K=1) and the output tensor has 2 channel slices (K=2). The In and Out slices are labeled using three digits, where the third digit is the channel slice.

Figure 9B:
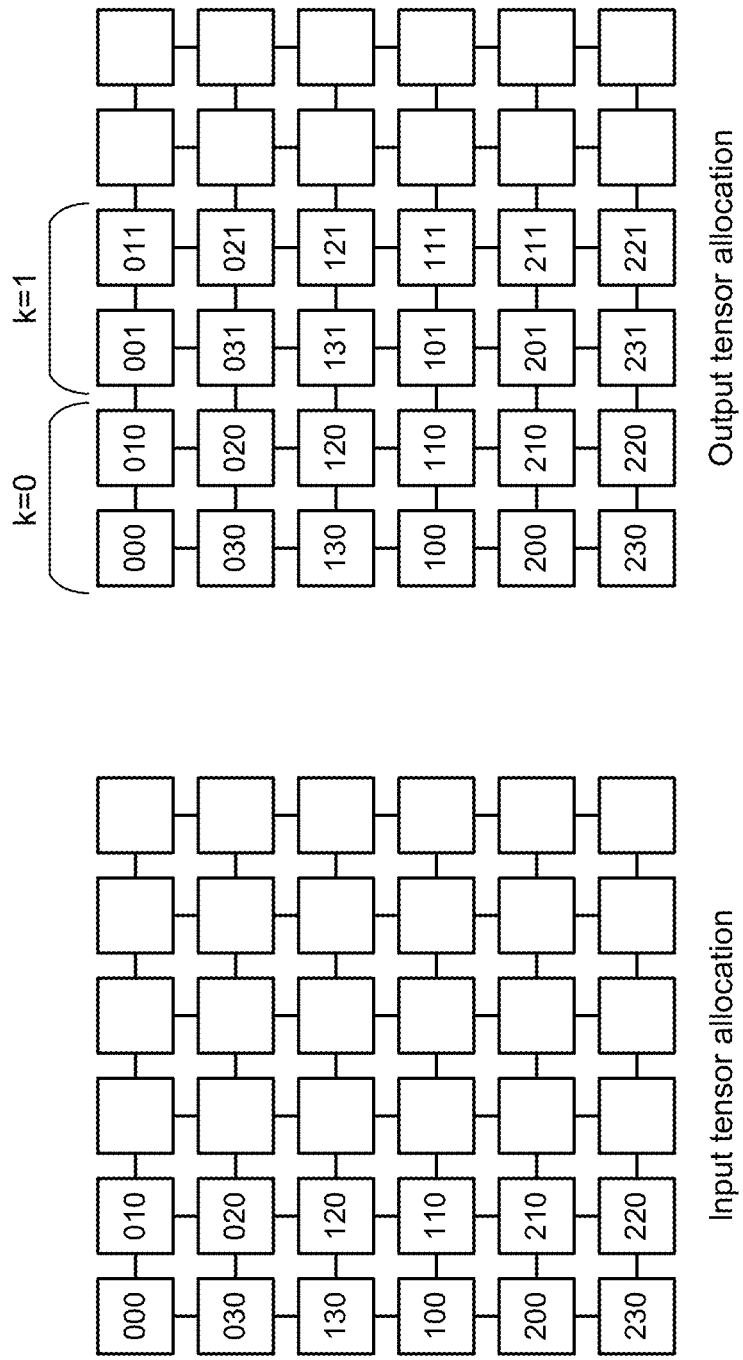
FIG. 9B is a physical layout of PEs showing allocation of slices to PEs.
Figure 10:
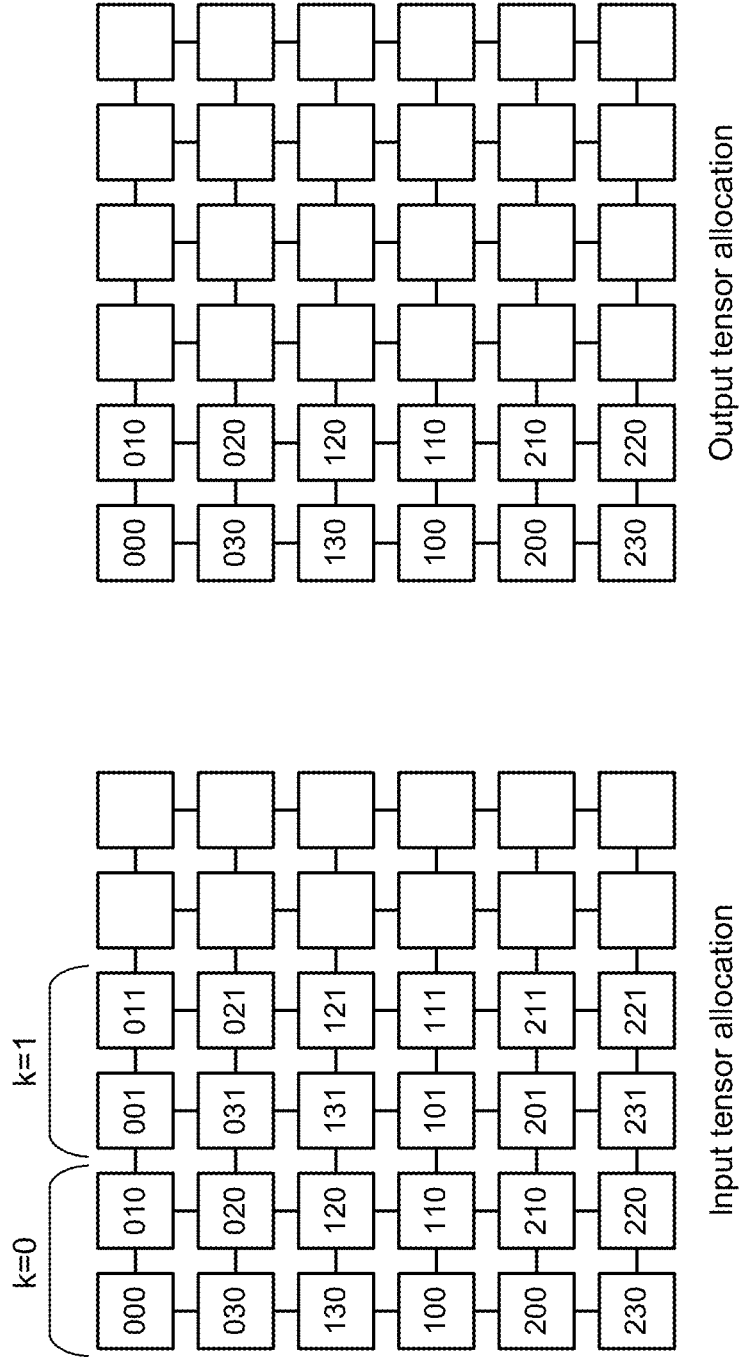
FIG. 10 is a physical layout of PEs showing another allocation of slices to PEs.

FIG. 9B shows the 6×6 physical layout of PEs, with the allocation of slices to PEs. The allocation for the input tensor is the same as in FIG. 4B. The output tensor has twice as many slices and is allocated to twice as many PEs. The allocation for channel slice 0 is the same as in FIG. 4B, and it is duplicated for the other channel slice 1. The physical layout of PEs for the two channel slices is the same, but channel slice 1 is shifted two PEs to the right of channel slice 0.

The data transfers for output channel slice 0 are the same as described above, because the situation is the same. For output channel slice 1, the input slices may be duplicated by shifting to the right by two physical PEs. This creates the same situation for output channel slice 1, as exists for output channel slice 0. The same data transfers may then be used for output channel slice 1.

FIG. 10 shows a reverse situation where the input tensor has two channel slices which are combined into the one output channel slice. In this case, input channel slice 1 may be concatenated with input channel slice 0 by shifting the data from channel slice 1 to the left by two physical PEs. The data transfers described above may then be used to create the support for the output slices.

Approaches similar to those shown in FIGS. 9 and 10 may also be used when the input tensor and output tensor have different spatial splits. For example, if the input tensor is partitioned into 3×4 input spatial slices, and the output tensor is partitioned into 6×8 output spatial slices, then the input slices may be duplicated analogous to FIG. 9B for channel slices. Similarly, input spatial slices may be combined if the output tensor is partitioned into fewer spatial slices than the input tensor.

Figure 11:
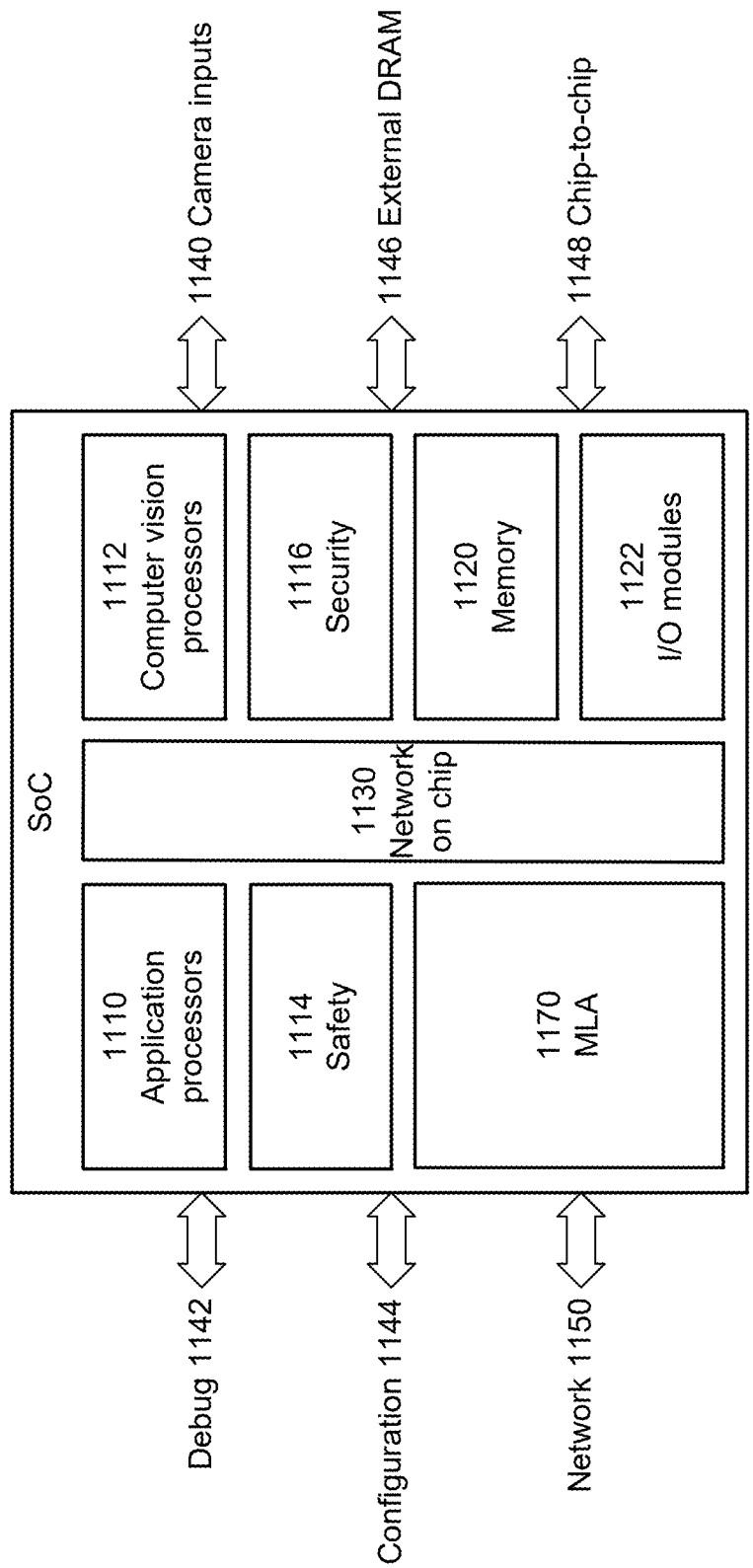
FIG. 11 is a block diagram of an integrated circuit product that includes an MLA.

FIG. 11 is a block diagram of an integrated circuit that includes an MLA 1170. Other components may be included on the same die as the MLA. This example includes the following additional blocks: application processor 1110 (e.g., general purpose CPU running applications), computer vision processor 1112 (or other types of application-specific processors), safety 1114, security 1116, additional SRAM (memory) 1120 and input/output circuitry 1122. It also includes a network 1130 for communication between the different components. This type of semiconductor chip may be referred to as a system-on-chip (SoC).

The connections to the external world include camera inputs 1140 for the computer vision processors, ports for debug 1142 and configuration 1144, a connection 1146 to external memory (e.g., DRAM), chip-to-chip connections 1148, and network connections 1150 (e.g., Ethernet and PCIe).

The SoC of FIG. 11 may be combined with other components to perform various tasks in edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time.

In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. For example, image samples may be input to the computer vision processors 1112, which perform initial operations such as edge detection and enhancement, contrast enhancement, motion detection, and optical flow. Raw and/or processed images may be then input to the MLA 1170 for analysis by the machine learning network. The MLA may also receive other inputs, such as metadata from other sources and data from other sensors. The application processors 1110 may also perform various functions in the overall pipeline and may also serve as a master controller that coordinates operation of the MLA and the other programmable processors in the pipeline.

Edge devices may be portable with less power available for computations compared to, for example, cloud-based server farms. It may also be desirable for the computing pipeline within the edge device to perform tasks without utilizing cloud-based or other remote compute resources. In some implementations, the MLA implements computations in the machine learning network at a performance of at least 50 TOPs (50 trillion operations per second) at a power consumption of not more than 5 watts. The performance may be increased by increasing the number of Tiles in the mesh or the number of Tile meshes on the die.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method for implementing a machine learning network (MLN) on a machine learning accelerator (MLA), the MLA implemented on a semiconductor die and comprising a plurality of hardware processing elements (PEs) connected by data transfer paths, the method comprising:
   receiving a description of the MLN, the description including calculation of an output tensor as a weighted sum of an input tensor;
   partitioning the input tensor into input slices and allocating each input slice to one of the PEs to form logical rows of PEs that correspond to either rows or columns of the input slices in the input tensor, wherein the PEs in each logical row are connected by data transfer paths and the logical rows are also connected by data transfer paths;
   partitioning the output tensor into output slices and allocating each output slice to one of the PEs to form logical rows of PEs that correspond to either rows or columns of the output slices in the output tensor, wherein the PEs in each logical row are connected by data transfer paths and the logical rows are also connected by data transfer paths, and each output slice is calculated as a weighted sum of a support of input slices;
   executing a set of instructions that implement calculation of the output tensor on the MLA, comprising:
     for output slices that have supporting input slices in a same logical row:
       executing concurrent instructions for intra-row shifts to transfer data from the supporting input slices to the output slices; and
     for output slices that have supporting input slices in a different logical row:
       executing concurrent instructions for inter-row transfers to transfer data from the supporting input slices to the output slices.

2. The method of claim 1 further comprising: statically scheduling the set of instructions, wherein the set of instructions is executed according to the static schedule.

3. The method of claim 1 wherein the output tensor is a convolution of the input tensor.

4. The method of claim 1 wherein the partitioning of the input tensor is a result of a prior calculation of the input tensor.

5. The method of claim 1 wherein the input tensor was calculated using a partition of the input tensor along a channel dimension, and the method further comprises: aggregating channel slices of the input tensor.

6. The method of claim 1 wherein the concurrent intra-row shifts comprise logical rows concurrently shifting in alternating directions.

7. The method of claim 1 wherein the intra-row shifts copy data stored at one PE to two or more other PEs in the same logical row.

8. The method of claim 1 wherein executing concurrent instructions for inter-row transfers comprises
   executing concurrent instructions for intra-row collections; and
   executing concurrent instructions for intra-row distributions.

9. The method of claim 8 wherein the intra-row collections collects data at PEs at ends of logical rows, and the intra-row distributions distribute data from PEs at ends of logical rows.

10. The method of claim 8 wherein the concurrent intra-row transfers comprise logical rows executing concurrent intra-row collections in alternating directions, and then executing concurrent intra-row distributions in an opposite direction as the intra-row collections.

11. The method of claim 1 wherein the inter-row transfers copy data stored at one PE to two or more PEs in the different logical row.

12. The method of claim 1 wherein the data transfer paths connecting adjacent logical rows are connected at alternating ends of the logical rows.

13. The method of claim 1 wherein the input tensor and output tensor have same spatial dimensions, are partitioned into the same slices, and corresponding input and output slices are allocated to the same PEs.

14. The method of claim 1 wherein the input tensor and output tensor have same spatial dimensions but different channel dimensions, and the output tensor is partitioned along a channel dimension, and the allocation of output slices to PEs has a physical layout of PEs of a same shape and size for each channel slice.

15. A machine learning accelerator comprising a plurality of hardware processing elements (PEs) connected by data transfer paths, wherein:
   input slices of an input tensor are allocated to the PEs to form logical rows of PEs that correspond to either rows or columns of the input slices in the input tensor, wherein the PEs in each logical row are connected by data transfer paths and the logical rows are also connected by data transfer paths;

output slices of an output tensor are allocated to the PEs to form logical rows of PEs that correspond to either rows or columns of the output slices in the output tensor, wherein the PEs in each logical row are connected by data transfer paths and the logical rows are also connected by data transfer paths, and each output slice is calculated as a weighted sum of a support of input slices;

for output slices that have supporting input slices in a same logical row: the PEs execute concurrent instructions for intra-row shifts to transfer data from the supporting input slices to the output slices; and for output slices that have supporting input slices in a different logical row: the PEs execute concurrent instructions for inter-row transfers to transfer data from the supporting input slices to the output slices.

16. The machine learning accelerator of claim 15 wherein the PEs execute the concurrent instructions according to a static schedule.

17. The machine learning accelerator of claim 15 further comprising: all adjacent PEs in each logical row are connected by data transfer paths, and all adjacent logical rows are connected by data transfer paths.

18. The machine learning accelerator of claim 15 further comprising: adjacent logical rows are connected by two or more data transfer paths.

19. The machine learning accelerator of claim 15 wherein the PEs and data transfer paths are all implemented on a semiconductor die.

20. The machine learning accelerator of claim 15 wherein the data transfer paths comprise network connections between the PEs.

* * * * *